US012746163B2

(12) United States Patent
Morse

(10) Patent No.: US 12,746,163 B2
(45) Date of Patent: Sep. 29, 2026

(54) PATIENT MOVING DEVICES (EDELGARD RISES)

(71) Applicant: Theodore Morse, Little Compton, RI (US)

(72) Inventor: Theodore Morse, Little Compton, RI (US)

( * ) Notice: Subject to any disclaimer, the term of this patent is extended or adjusted under 35 U.S.C. 154(b) by 0 days.

(21) Appl. No.: 19/373,678

(22) Filed: Oct. 29, 2025

(65) Prior Publication Data

US 2026/0108407 A1 Apr. 23, 2026

Related U.S. Application Data

(63) Continuation of application No. 18/614,373, filed on Mar. 22, 2024, now Pat. No. 12,478,531.

(60) Provisional application No. 63/493,289, filed on Mar. 30, 2023, provisional application No. 63/491,821, filed on Mar. 23, 2023.

(51) Int. Cl.
*A61G 7/10* (2006.01)
*A61G 5/14* (2006.01)

(52) U.S. Cl.
CPC ............ *A61G 7/1038* (2013.01); *A61G 5/14* (2013.01); *A61G 7/1034* (2013.01); *A61G 7/1011* (2013.01); *A61G 7/1046* (2013.01); *A61G 7/1051* (2013.01); *A61G 7/1074* (2013.01)

(58) Field of Classification Search
None
See application file for complete search history.

(56) References Cited

FOREIGN PATENT DOCUMENTS

WO 2008068591 A2 6/2008

*Primary Examiner* — Adam C Ortiz
(74) *Attorney, Agent, or Firm* — Adler Pollock & Sheehan P.C.

(57) ABSTRACT

Safe lifting devices configured for lifting of a fallen patient from a surface and for a transport of the patient are disclosed herein. The devices comprise a class 1 lever including two larger wheels disposed about parallel at a fulcrum of the lever with each of the two larger wheels having shorter load leverage arms and longer effort leverage arms extending radially outward and defining a lever angle of greater than 90°. Each of the larger wheels disposed at the fulcrum includes a smaller rolling wheel attached to each larger wheel by an axle and a medium rolling wheel attached to each larger wheel by a different axle. When an operator pulls down the longer effort leverage arms the patient is safely lifted.

20 Claims, 21 Drawing Sheets

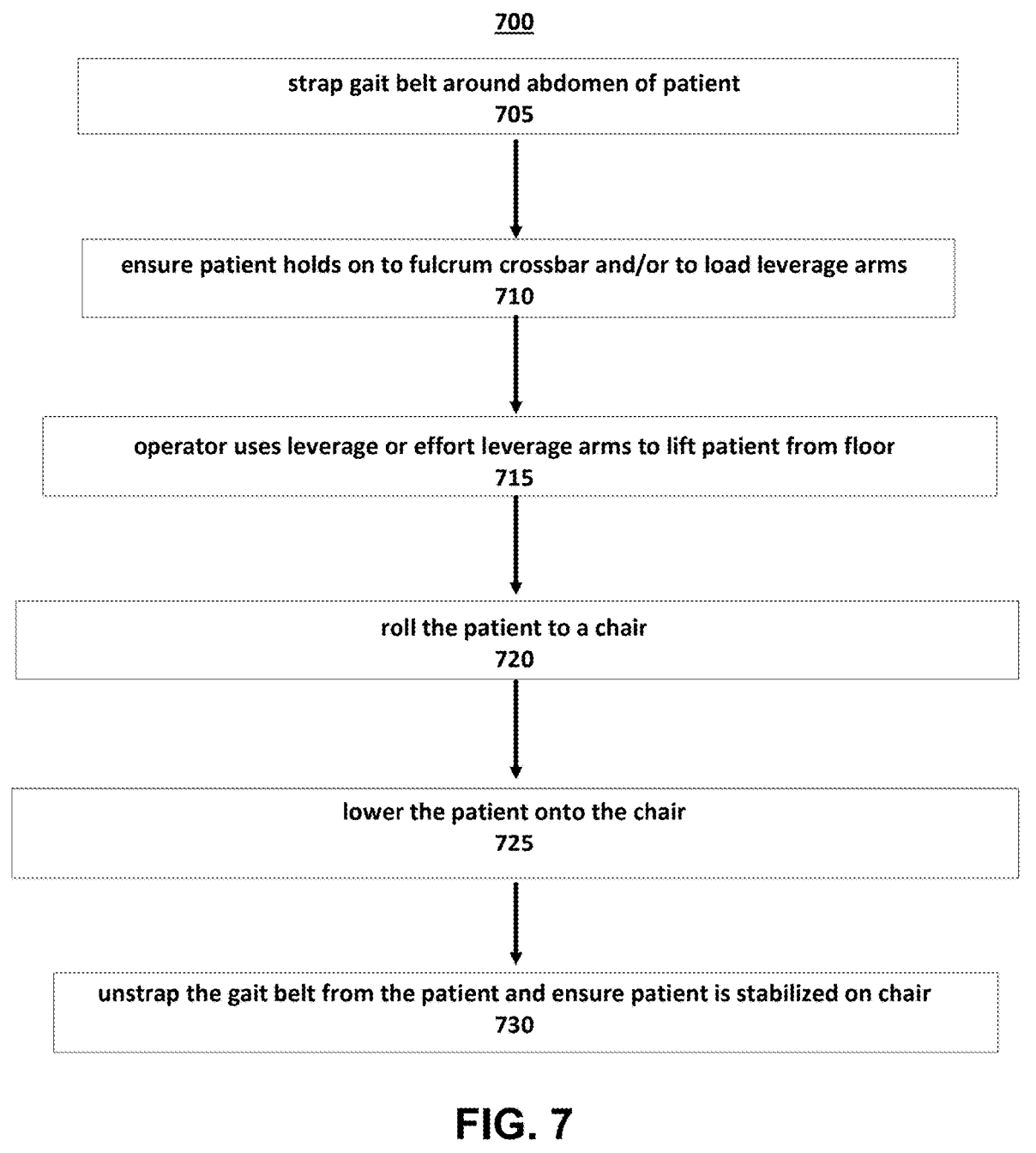

700 strap gait belt around abdomen of patient
705

↓ ensure patient holds on to fulcrum crossbar and/or to load leverage arms
710

↓ operator uses leverage or effort leverage arms to lift patient from floor
715

↓ roll the patient to a chair
720

↓ lower the patient onto the chair
725

↓ unstrap the gait belt from the patient and ensure patient is stabilized on chair
730

FIG. 7

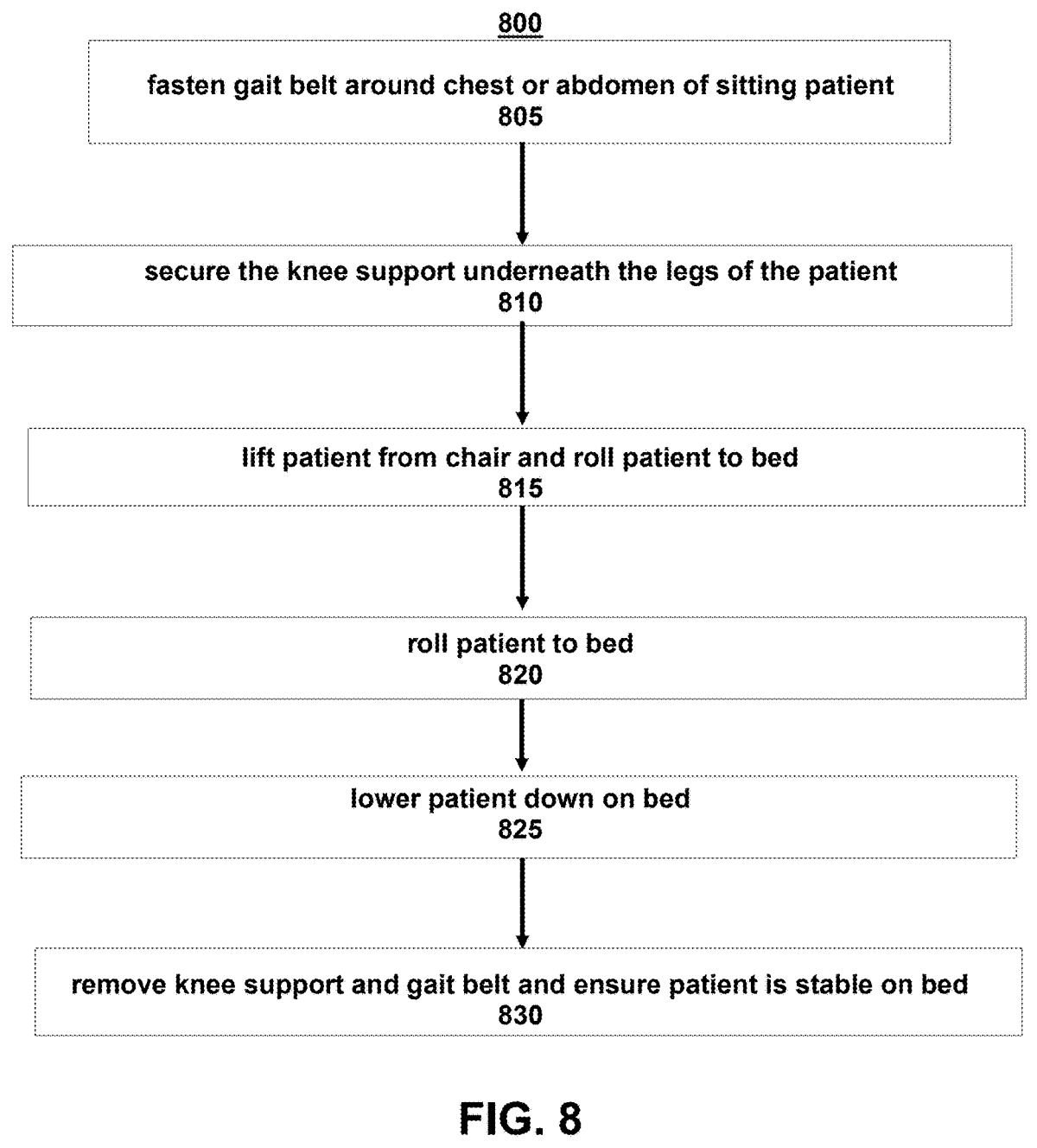

800 fasten gait belt around chest or abdomen of sitting patient
805 secure the knee support underneath the legs of the patient
810 lift patient from chair and roll patient to bed
815 roll patient to bed
820 lower patient down on bed
825 remove knee support and gait belt and ensure patient is stable on bed
830

FIG. 8

PATIENT MOVING DEVICES (EDELGARD RISES)

CROSS-REFERENCE TO RELATED APPLICATIONS

This application is a continuation of U.S. patent application Ser. No. 18/614,373 filed Mar. 22, 2024, which claims the benefit of priority to United States (US) provisional application No. 63/491,821, filed Mar. 23, 2023, the disclosure of which is incorporated by reference as if fully set forth herein in its entirety. This application also claims the benefit of priority to U.S. provisional application No. 63/493,289, filed Mar. 30, 2023, the disclosure of which is incorporated by reference as if fully set forth herein in its entirety.

FIELD OF THE INVENTION

The embodiments of the present invention relate to patient moving and lifting devices and the associated methods of using the patient moving devices, in particular, for a lifting of a patient that has fallen up off of the floor by another helping person using the devices and for providing of a mechanical advantage so that the weight of the patient can be managed by the helping person.

BACKGROUND OF THE INVENTION

According to the Centers for Disease Control and Prevention (CDC), there are about 36 million falls reported among older adults each year in the United States (US)[1]. Every second of every day, an older adult (i.e., age 65+) suffers a fall in the US—making falls the leading cause of injury and injury death in this age group (CDC). Regardless of age, often a fallen person at home cannot get up from the floor. A companion will call an emergency 911 phone number because, typically, the companion cannot lift the fallen person. A fire truck or an ambulance is ready to answer the 911 emergency calls, at any time of the day. A fire truck or an ambulance can cost an average to the taxpayers of $1,000 every time they go out to answer a 911 call. In one scientific study, the average direct cost for a single fall in the US was $35,365 USD (US dollars)[2].

Unfortunately, there is no easy solution to the costs of falls, particularly when a person is at home alone and experiences a fall. Looking at total costs (US), the CDC estimates that each year about $50 billion (USD) is spent on medical costs related to older adult falls[3]. There are some paid services such as Lifeline or Life Alert®, but ultimately even the paid services rely on an emergency caregiver. Sadly, when a person falls at home with a companion, there is not a practical solution for the companion to safely lift the fallen person. What is urgently needed are intelligently applied devices for safe moving and lifting of fallen patients that can be immediately deployed in a home.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is known that there is no safe patient moving and lifting device practically on the market that uses leverage or double leverage. It is estimated that a lifting device that is disclosed herein can cost less than $200 dollars (USD) for aluminum lever construction, and $400 (USD) for carbon fiber lever construction. In some embodiments, in a non-limiting example, the devices disclosed herein can weigh about 12 kilograms.

In some embodiments, if a patient is living with a companion who is not able to help him/her up, the technology disclosed herein will provide leverage to get the patient into a chair. For patients living alone, perhaps a neighbor or friend may be called who could then lift the patient according to the methods and devices disclosed herein. The technology herein can be used in short-staffed hospitals and nursing homes when only one nurse is available. Airports and other transportation sites could similarly utilize it.

The devices disclosed herein include systems of wheels and moveable lever arms that enable a person (i.e., a companion living with a patient or other non-medical/emergency personnel) to use leverage and thereby lift the patient from a fall (e.g., the floor) to a chair, bed or other surface (e.g., see FIG. 5B), or from a sitting position to a standing position (e.g., see FIG. 6C).

There are many situations in which a patient is sitting up with the legs over the side of the bed, and they have to be taken to a toilet/commode, and to be seated afterward. If they are seated, the leverage required to lift them (bed/commode/seat) is much less than to get a fallen victim from the floor to a seated position. The devices disclosed herein can be configured with one lever arm, instead of two lever arms. In this configuration, more accessibility can be provided. (as required by the Edelgard Rises I device). In some embodiments, a patient with a weight shown in Table 1 below can be lifted by an operator force shown below in "lfb".

TABLE 1

EXAMPLE WEIGHTS LIFTED AND OPERATOR FORCES

| | | | | |
|---|---|---|---|---|
| Patient Weight, lbs. | 300 | 250 | 200 | 150 |
| Operator's: Maximum force, lbf* | 200 | 167 | 133 | 100 |

In Table 1 above, the "lbf" is used here as a unit of pound-force that is equal to the gravitational force exerted on a mass of one avoirdupois pound on the surface of Earth (i.e., 1 lbf of pound-force≈4.448222 N).

In various embodiments, components of the device (e.g., the lever arms) are constructed from lightweight materials that facilitate its transportation. Such materials include, but are not limited to, aluminum and carbon fiber. For example, lever arms constructed from carbon fiber may weigh less than 20 pounds, which make it easy to carry the device around despite its bulk (in some embodiments, due to the 16"-20" wheels). In an embodiment, for an "Edelgard Rises II" device, the tubes are carbon fiber deflection optimized telescoping tubes or rods (e.g., see FIG. 3I).

Methods of using the devices are described herein, with reference to the various figures. For example, a method can include the following steps: the device is unfolded from its folded/storage configuration; the device is maneuvered to position it under the arms of a fallen patient, or a patent that is lifted from the bed/commode/seat. In an embodiment, a padding in the leverage handles is folded to guide the forward 5" wheels to guide the device under the patient's arms. In some embodiments, foam padding is included under the leverage arms to cushion the weight of supporting the fallen patient. Next, there is an assisting of the fallen patient to get into the upright position. Then, there is executed an unfolding of the supporting leverage arms so that they are hinged once. The leverage arms are placed into position. There is a firm adjusting of a gait belt to the fallen patient, and once comfortable, the lifting procedure is begun. The fallen patient is instructed to grip onto the levers or fulcrum crossbars, which have padding in various embodiments.

The devices of the present invention have multiple applications. For example, the devices may be used in buses, trains, short-staffed hospitals and nursing homes when only one nurse is available. Cab stations and other transportation sites could similarly utilize it. There are other situations in which the invention can be used.

In various embodiments, the device may be used in conjunction with LifeLine (or a similar facility), FaceTime or other telemedicine applications. In one example, LifeLine (or a similar facility) or a companion calls a nurse on duty at a given number, and the nurse will assess the patient's ability to get up using one of the devices disclosed herein. If the patient or companion has a smart phone, the nurse will view the fallen patient via FaceTime. Since the onset of the Covid epidemic, telemedicine has become more prevalent; insurance may be involved, which would relieve LifeLine (or similar facility) of any financial responsibilities. For patients living alone, a neighbor or friend may be called who could then lift the patient using the devices according to its directions or via a call with LifeLine (or similar facility) who would then consult a telemedicine nurse, and the nurse would have the final decision about calling 911.

In general, any combination of disclosed features, components and methods described herein is possible. Steps of a method can be performed in any order that is physically possible.

In some embodiments, the technology herein provides a safe lifting device configured for a lifting of a fallen patient from a surface and for a transport of the patient, the device comprising a class 1 lever including: two larger wheels disposed about parallel at a fulcrum of the lever; each of the two larger wheels having a shorter load leverage arm extending radially outward to the patient and a longer effort leverage arm extending radially outward; wherein a lever angle greater than 90° is defined by a crossing of a load leverage arm and an effort leverage arm at the fulcrum; wherein at a terminal end of each effort leverage arm is attached a hinge with an adjustable effort handle capable of accepting a lifting up force or a pulling down force by an operator; wherein each of the larger wheels disposed at the fulcrum includes a smaller rolling wheel attached to each larger wheel by an axle; wherein a lifting up of the longer effort leverage arms will cause a pivot of the two larger wheels to sit upon the two smaller rolling wheels to provide a lowering of a shorter load leverage arm capable to reach the fallen patient; and wherein each of the larger wheels disposed at the fulcrum includes a medium rolling wheel attached to each larger wheel by an axle; wherein a pulling down of the longer effort leverage arms will cause a pivot of the two larger wheels to sit upon the two medium rolling wheels to provide a lifting up of the fallen patient and a raising of the load leverage arm with the medium wheels operative to transport the patient across the surface.

According to some aspects, the safe lifting device is configured wherein a length of the longer arms added with a length to a distal end of the effort handle defines an effort length; wherein a length of the shorter load leverage arms defines a load length; wherein dividing the effort length by the load length defines a mechanical advantage (MA); and wherein the MA is in a range about under 2.

In some embodiments, the safe lifting device is further comprising a cable or a rope affixed to a terminal end of the longer effort leverage arm or a terminal end of the adjustable effort handle; the cable (or rope) comprising a distal configuration operative to accept a foot of the operator for providing an additional pulling down force by the operator.

According to some aspects, the safe lifting device is further comprising wherein the two larger wheels are connected together by one or more fulcrum crossbars; wherein each of the one or more fulcrum crossbars is parallel to the fulcrum of the lever.

In some embodiments, the safe lifting device is configured wherein a length of the shorter load leverage arm is in a range from about 60 cm to about 155 cm.

According to some aspects, the safe lifting device is wherein a length of the longer arms added with a length to a distal end of the effort handle defines an effort length in a range from about 120 cm to about 310 cm.

In some embodiments, the safe lifting device is configured wherein the load leverage arms and/or the effort leverage arms include one or more telescoping tubes or beams operative to provide a retracting of the arms for a storage or a transport configuration.

In some embodiments, the safe lifting device is further comprising a gait belt at or near a distal end of the load leverage arms; the gait belt operative to secure a patient at or near the distal end of the load leverage arms for a lifting of the patient.

According to some aspects, the safe lifting device is further comprising a knee support harness, a lifting sling, or a transport harness affixed at or near a center of the load leverage arms; the knee support, lifting sling, or transport harness operative to support one or more legs of the patient while or during a lifting of the patient.

In some embodiments the safe lifting device above is configured wherein the hinge further comprises a ratchet disposed at the hinge; the ratchet operative to provide one or more adjustment positions of the adjustable effort handle; and wherein the one or more adjustment positions are capable of providing a greater leverage to the operator, a movement of the effort handle to accommodate a lowering of the patient, a movement of the effort handle to accommodate a lifting of the patient, or a combination thereof.

According to some aspects, a method for a safe lifting of a fallen patient from a surface to a chair height, a bed height, a wheelchair height, or a commode height is disclosed herein, the method comprising the steps of: step (1) obtaining a safe lifting device comprising a class 1 lever including: two larger wheels disposed about parallel at a fulcrum of the lever; each of the two larger wheels having a shorter load leverage arm extending radially outward to the patient with a gait belt and a longer effort leverage arm extending radially outward; wherein a lever angle greater than 90° is defined by a crossing of a load leverage arm and an effort leverage arm at the fulcrum; wherein at a terminal end of each effort leverage arm is attached a hinge with an adjustable effort handle capable of accepting a lifting up force or a pulling down force by an operator; and wherein each of the larger wheels disposed at the fulcrum includes a smaller rolling wheel attached to each larger wheel by an axle; wherein a lifting up of the longer effort leverage arms will cause a pivot of the two larger wheels to sit upon the two smaller rolling wheels to provide a lowering of a shorter load leverage arm capable to reach the fallen patient; wherein each of the larger wheels disposed at the fulcrum includes a medium rolling wheel attached to each larger wheel by an axle; wherein a pulling down of the longer effort leverage arms will cause a pivot of the two larger wheels to sit upon the two medium rolling wheels to provide a lifting up of the fallen patient and a raising of the load leverage arm with the medium wheels operative to transport the patient across the surface; step (2) affixing the gait belt to the patient or to a chest area of the patient; step (3) pulling down the longer effort leverage arms; and whereby a lifting up of the fallen patient from the surface to a height is provided.

In some embodiments, the method is executed further comprising the step of: (4) rolling the device with the patient on the two medium rolling wheels to a chair, a bed, a wheelchair, or a commode. According to some aspects, the method above is wherein the device further comprises a cable affixed to a terminal end of the longer effort leverage arm or a terminal end of the adjustable effort handle; the cable comprising a distal configuration operative to accept a foot of the operator for providing an additional pulling down force by the operator; and wherein step (3) further comprises: placing an operator's foot into the distal configuration and applying a greater pulling down by a use of a portion of an operator's weight.

In some embodiments, the method above is further comprising wherein a length of the longer arms added with a length to a distal end of the effort handle defines an effort length; wherein a length of the shorter load leverage arms defines a load length; wherein dividing the effort length by the load length defines a mechanical advantage (MA); and wherein the MA during an execution of the method is in a range from 1.5 to 2.0.

According to some aspects, the method above is wherein the safe lifting device is further comprising a knee support harness, a lifting sling, or a transport harness affixed at or near a center of the load leverage arms; the knee support, lifting sling, or transport harness operative to support one or more legs of the patient while or during a lifting of the patient; and wherein the method further comprises the step of securing the knee support, lifting sling, or transport harness underneath a leg of the patient.

In some embodiments, the method above is executed wherein the hinge further comprises a ratchet disposed at the hinge; the ratchet operative to provide one or more adjustment positions of the adjustable effort handle; and wherein the one or more adjustment positions are capable of providing a greater leverage to the operator, a movement of the effort handle to accommodate a lowering of the patient, a movement of the effort handle to accommodate a lifting of the patient, or a combination thereof; and wherein the method further comprises the step of: adjusting the ratchet to achieve a greater leverage by the operator.

According to some aspects, the method disclosed above is further comprising the step of: (5) lowering the patient to a lower surface, a chair, a bed, a wheelchair, or a commode.

In some embodiments, the method above is executed further comprising the step of: (2b) ensuring the patient holds on to the device at or near the fulcrum or on one or more of the load leverage arms.

According to some aspects, the method disclosed above is wherein the safe lifting device is further comprising wherein the two larger wheels are connected together by one or more fulcrum crossbars; wherein each of the one or more fulcrum crossbars is parallel to the fulcrum of the lever; and wherein the method further comprises the step of ensuring the patient holds on to the device at one or more of the fulcrum crossbars and/or at a load leverage arm.

In some embodiments, a kit configured for sale is disclosed herein, the kit comprising: a safe lifting device configured for a lifting of a fallen patient from a surface and a transport of the patient, the device comprising a class 1 lever including: two larger wheels disposed about parallel at a fulcrum of the lever; each of the two larger wheels having a shorter load leverage arm extending radially outward to the patient and a longer effort leverage arm extending radially outward; wherein a lever angle greater than 90° is defined by a crossing of a load leverage arm and an effort leverage arm at the fulcrum; wherein at a terminal end of each effort leverage arm is attached a hinge with an adjustable effort handle capable of accepting a lifting up force or a pulling down force by an operator; wherein each of the larger wheels disposed at the fulcrum includes a smaller rolling wheel attached to each larger wheel by an axle; wherein a lifting up of the longer effort leverage arms will cause a pivot of the two larger wheels to sit upon the two smaller rolling wheels to provide a lowering of a shorter load leverage arm capable to reach the fallen patient; and wherein each of the larger wheels disposed at the fulcrum includes a medium rolling wheel attached to each larger wheel by an axle; wherein a pulling down of the longer effort leverage arms will cause a pivot of the two larger wheels to sit upon the two medium rolling wheels to provide a lifting up of the fallen patient and a raising of the load leverage arm with the medium wheels operative to transport the patient across the surface.

In some embodiments, the devices herein can be provided wherein there are one or more markings on the devices to indicate, for example, locations for a patient to grip or hold on to, locations for an operator to apply force, or safety indications.

Any of the devices disclosed herein can be further comprising a safety brake on one or more of the wheels. Any safety features known can be applied to the devices and methods herein.

These and other features and advantages will be apparent from a reading of the following detailed description and a review of the associated drawings. It is to be understood that both the foregoing general description and the following detailed description are explanatory only and are not restrictive of aspects as claimed.

Other implementations are also described and recited herein. These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Solely for the purpose of illustration, certain embodiments of the present invention are explained using examples in the drawings described below. It should be understood, however, that the invention is not limited to the precise arrangements, dimensions, and configurations shown. In the drawings:

FIG. 7 shows a flowchart for a method 700 for moving a fallen patient to a sitting position (e.g., sitting on a chair).

FIG. 8 shows a flowchart for a method 800 for moving a patient from a sitting position to a bed position.

Figure 1A:
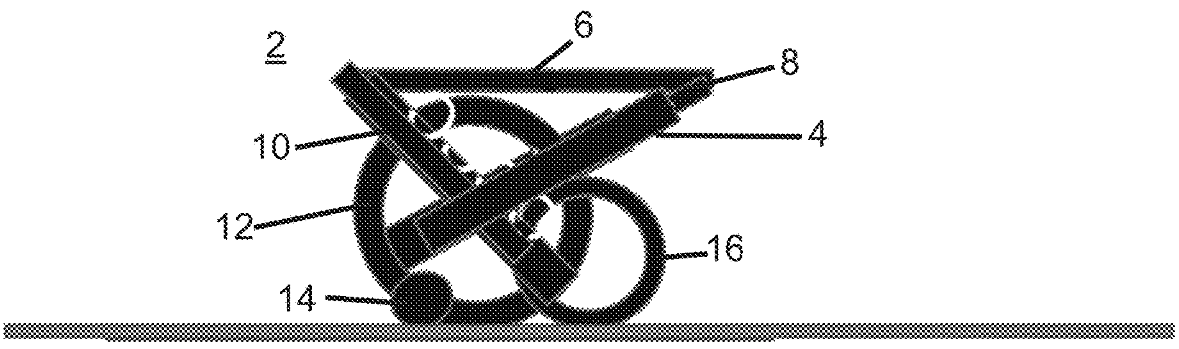
FIG. 1A shows a side-view diagram of a device of the present technology in a folded nested device 2 configuration. It is important to note that the diagram is a side view and corresponding features or other side wheels are not yet visible on the other side.

All trademarks, images, likenesses, words, and depictions in the drawings and the disclosure are plainly in fair use and are provided solely for the purposes of illustration of the invention in view of an urgent need to treat subjects as further discussed in detail below.

DETAILED DESCRIPTION OF THE INVENTION

The subject innovation is now described in some instances, when necessary, with reference to the drawings. In the following description, for purposes of explanation, numerous specific details are set forth in order to provide a thorough understanding of the present invention. It may be evident, however, that the present invention may be practiced without these specific details. In other instances, well-known structures, methods, and devices are shown in block diagram form or with illustrations in order to facilitate describing the present invention. It is to be appreciated that certain aspects, modes, embodiments, variations and features of the invention are described below in various levels of detail in order to provide a substantial understanding of the present invention.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail. In general, typical chemical terminology is found in the International Union of Pure and Applied Chemistry GoldBook[4]. This disclosure is purposefully presented in commonly understood words, known to a person of skill in the art, but Merriam-Webster's Online Dictionary is used, when appropriate, for terms not specifically demonstrated herein or not known in the art[5].

As used in this specification and the appended claims, the singular forms "a," "an" and "the" include plural referents unless the content clearly dictates otherwise. For example, reference to "a cell" includes a combination of two or more cells, and the like.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation. The term "including" can be interchanged with "comprising".

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the invention. The term "consisting essentially of" can also be exemplified by plain language provided in the claims.

As used herein, the term "subject" can be used interchangeably with "patient".

The term "statistically significant" or "significantly" refers to statistical significance and generally means a two-standard deviation (2SD) or greater difference.

As used herein, the term "subject" refers to a mammal, including but not limited to a human, dog, cat, horse, cow, pig, sheep, goat, rodent, or other primate. Subjects can be house pets (e.g., dogs, cats), agricultural stock animals (e.g., cows, horses, pigs, chickens, etc.), laboratory animals (e.g., mice, rats, rabbits, etc.), but are not so limited. Subjects particularly include human subjects in urgent treatment as is described herein. The human subject may be a pediatric, adult, or a geriatric subject. The human subject may be of any sex. The human patient might have limited or zero mobility.

The term "treating" includes prophylactic and/or therapeutic treatments. The term "prophylactic or therapeutic" treatment is art-recognized and includes administration to the host of one or more of the subject compositions and/or application of one or more therapies or surgeries. If this is done prior to clinical manifestation of the unwanted condition (e.g., disease or other unwanted state of the host animal) then the treatment is prophylactic (i.e., it protects the host against developing the unwanted condition), whereas if it is administered after manifestation of the unwanted condition, the treatment is therapeutic, (i.e., it is intended to diminish, ameliorate, or stabilize the existing unwanted condition or side effects thereof).

As used herein, the terms "treat," "treatment," "treating," or "amelioration" when used in reference to a disease, disorder, or medical condition, refer to therapeutic treatments for a condition, wherein the object is to reverse, alleviate, ameliorate, inhibit, slow down or stop the progression or severity of a symptom or condition. The term "treating" includes reducing or alleviating at least one adverse effect or symptom of a condition. Treatment is generally "effective" if one or more symptoms or clinical markers are reduced. Alternatively, treatment is "effective" if the progression of a condition is reduced or halted. That is, "treatment" includes not just the improvement of symptoms or markers, but also a cessation or at least slowing of progress or worsening of symptoms that would be expected in the absence of treatment. Beneficial or desired clinical results include, but are not limited to, alleviation of one or more symptom(s), sign(s), diminishment of extent of the deficit, stabilized (i.e., not worsening) state of a symptom or condition, delay or slowing of onset of symptoms or indications, and an increased lifespan as compared to that expected in the absence of treatment.

The terms: "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g., the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. A decrease can be preferably down to a level accepted as within the range of normal for an individual without a given disorder.

In some embodiments, the decrease in the one or more signs or symptoms is evaluated according to a specialized healthcare provider. In some embodiments, signs are observed or measured by a health care provider. Symptoms can be reported by the subject. In some embodiments, the decrease of signs or symptoms occurs in less than about 120 minutes, 90 minutes, less than about 60 minutes, less than about 30 minutes, less than about 15 minutes, less than about 10 minutes, or less than about 5 minutes, or less than about 3 minutes, or less than about 1 minute. In some embodiments, the decrease of signs or symptoms occurs in less than 1 day, less than 1 week, less than 1 month, or in less than 1 year.

The terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, a "increase" is a statistically significant increase in such level.

As used herein, an operator trying to help a patient is a person trying to safely lift and transport a patient. As used herein a single mark "can be used to indicate inches.

A subject can be one who has been previously diagnosed with or identified as suffering from or having a condition in need of treatment (e.g., a mobility condition) or one or more complications related to such a condition, and optionally, but need not have already undergone treatment for a condition or the one or more complications related to the condition. Alternatively, a subject can also be one who has not been previously diagnosed as having a condition in need of treatment or one or more complications related to such a condition. For example, a subject can be one who exhibits one or more risk factors for a condition, or one or more complications related to a condition or a subject who does not exhibit risk factors. A "subject in need" of treatment for a particular condition can be a subject having that condition, diagnosed as having that condition, suspected as having, or at risk of developing that condition. In another example, the subject has been brought into a treatment situation entirely without the subject's knowledge and/or intent. For example, a subject can obviously be in need of treatment but not be responsive to an immune checkpoint inhibitor, and as described herein the present methods and formulations may save the subject's life.

As discussed above, unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only and is not intended to limit the scope of the present invention, which is defined solely by the claims. Definitions of common terms in immunology and molecular biology can be found in The Merck Manual of Diagnosis and Therapy;[6] The Encyclopedia of Molecular Cell Biology and Molecular Medicine;[7] Molecular Biology and Biotechnology: a Comprehensive Desk Reference;[8] Immunology;[9] Janeway's Immunobiology;[10] Lewin's Genes XI;[11] Molecular Cloning: A Laboratory Manual.;[12] Basic Methods in Molecular Biology;[13] Laboratory Methods in Enzymology;[14] Current Protocols in Molecular Biology (CPMB)[15]; Current Protocols in Protein Science (CPPS);[16] and Current Protocols in Immunology (CPI)[17].

In the embodiments discussed and in any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

The devices and methods disclosed herein have been tested and are safe as shown in the Figures. Use of the devices and/or methods outside of the safe methods and illustrations is done so at one's own risk. Other terms are defined herein within the description of the various aspects of the invention.

Patient Moving Devices (Edelgard Rises)

It is common in many residential neighborhoods for people to fall inside their houses and have troubles getting back up. In many cases, emergency services including the fire department is called to the neighborhood after an emergency call is placed. The response of fire trucks can be large and impressive, but this can be costly for a fall. There are services such as who choose calling devices/facilities like Lifeline or Life Alert®. When a patient falls and uses the device, an operator asks if the patient is in need of assistance. Often a husband, wife, or companion who makes the call cannot get the patient into a sitting position from which he or she can then stand by himself/herself. Thus, there is an urgent need for a device to facilitate the lifting/moving of the patient. Just the yearly cost of emergency services coming to help fallen patients is staggering. Embodiments of the devices and methods of the present invention are illustrated in the figures below and attached images.

In a broad embodiment, a huge problem is solved by enabling the safe lifting and transport of a person with limited mobility. The technology disclosed herein can improve the safe lifting of another person.

In a folded, compact, or storage embodiment, FIG. 1A shows a side-view diagram of a device of the present technology in a folded (or storage) device 2 configuration with effort leverage arms 4 (compacted from telescopic length and/or folded). It should be understood that telescoping rods, beams, or blocks can be used for leverage arms at any position in the devices herein. FIG. 1A shows adjustable effort handle 6, effort handle hinge 8, load leverage arms 10 (compacted or folded), wheel fulcrum 12, first lifting wheels 14, and second lifting wheels 16. It is important to note the diagram is a side view and corresponding wheels are not yet visible on the other side. In some embodiments, the device weighs about 20 pounds to about 27 pounds. The device provides sufficient leverage, according to some aspects, so a nurse that weighs only 133 pounds, can lift a person that weighs 200 pounds. In some embodiments, the device is made of carbon fiber (2"×1"×⅛" wall thickness). According to some aspects, the device can have 17" diameter magnesium, aluminum, or carbon fiber wheels. In some embodiments, load leverage arms and/or effort leverage arms include nested carbon fiber, about 2 mm thick and can include lengths of about 2"×24", 1.75"×24", and 1.5"×24". It is contemplated that the devices of the present technology can be made much larger for horses, livestock, or larger mammals, and in these instances the weights and sizes could be much larger.

Figure 1B:
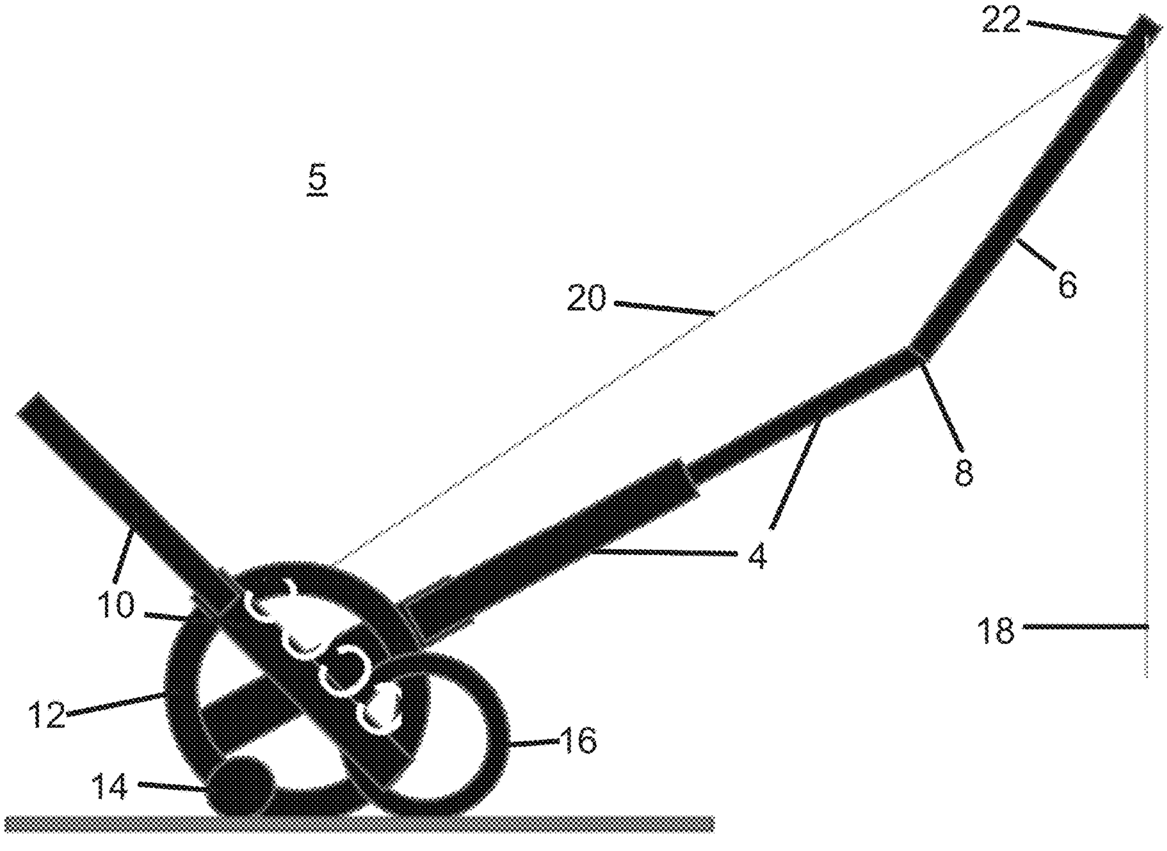
FIG. 1B shows a diagram of a device of the present technology in an unfolded or expanded device 5 configuration with effort leverage arms 4 (telescopically extended or unfolded) and load leverage arms 10 (telescopically extended or unfolded).
Figure 1C:
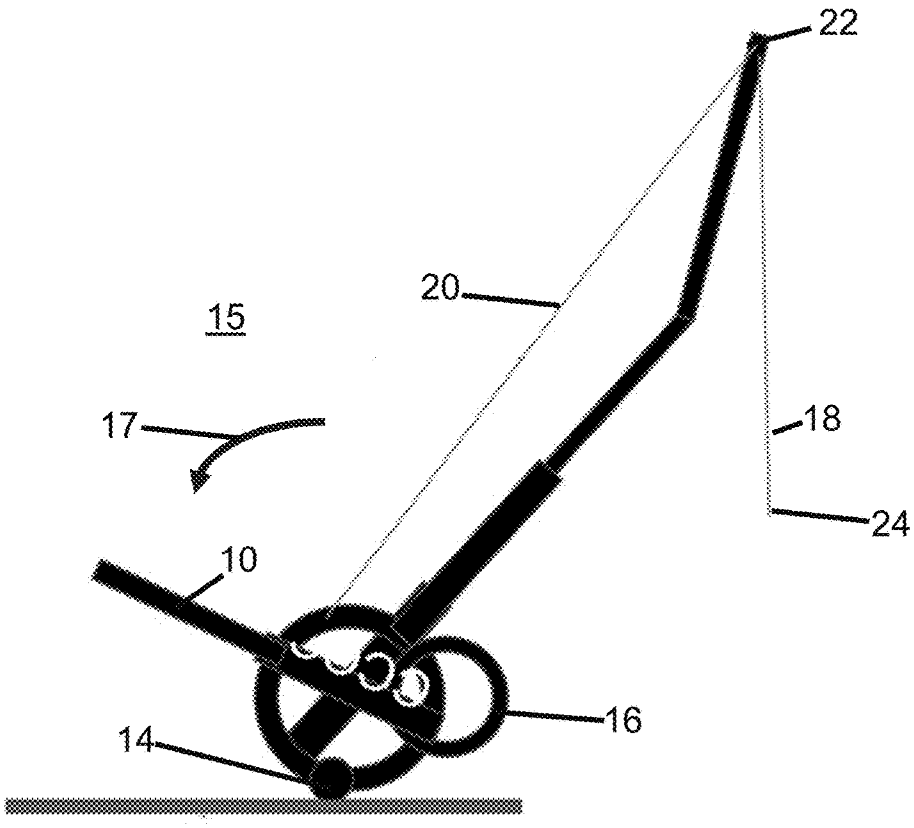
FIG. 1C shows a diagram of a device of the present technology in a patient lifting position 15 where arc 17 shows motion compared to FIG. 1B and the device is now resting on the first lifting wheels 14 at bottom.
Figure 1D:
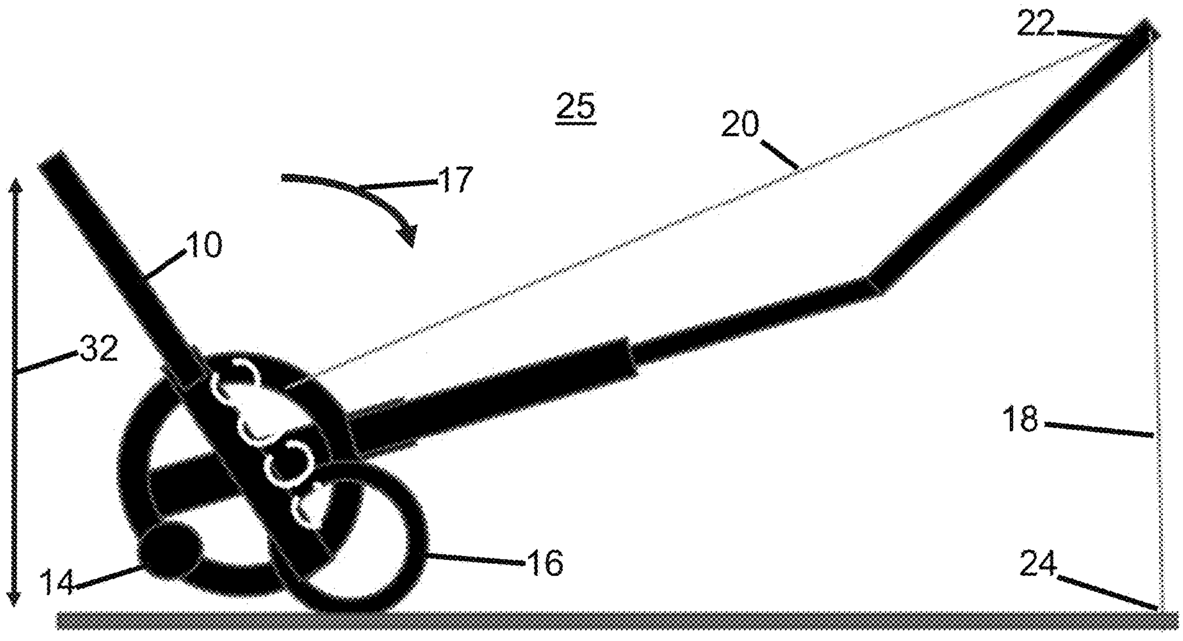
FIG. 1D shows a diagram of a device of the present technology in a patient lifted partially to chair height (double arrow at 32) position 25 where arc 17 shows motion compared to FIG. 1C.

According to some aspects, FIG. 1B shows a diagram of a device of the present technology in an unfolded or expanded device 5 configuration with effort leverage arms 4 (telescopically extended or unfolded), adjustable effort handle 6, effort handle hinge 8, load leverage arms 10 (telescopically extended or unfolded), wheel fulcrum 12, first lifting wheels 14, second lifting wheels 16, foot cable 18, lifting cable 20, and cable pully 22. FIG. 1C shows a diagram of a device of the present technology in a patient lifting position 15 where arc 17 shows motion compared to FIG. 1B and the device is now resting on the first lifting wheels 14 at bottom. In the unfolded position, the device can provide a leverage (or mechanical advantage) in the range of about 1.5. In some embodiments, FIG. 1D shows a diagram of a device of the present technology in a patient lifted to chair height (double arrow at 32) position 25 where arc 17 shows motion compared to FIG. 1C and the device is now resting on the second lifting wheels 16. Chair height is in a range from about 14 inches (35.56 cm) to about 22 inches (55.88 cm) or about 18 inches (45.72 cm). As can be seen from the arc or arrow 17, the load leverage arms 10 have been move up by a tilting down of the effort leverage arms 4.

Figure 1E:
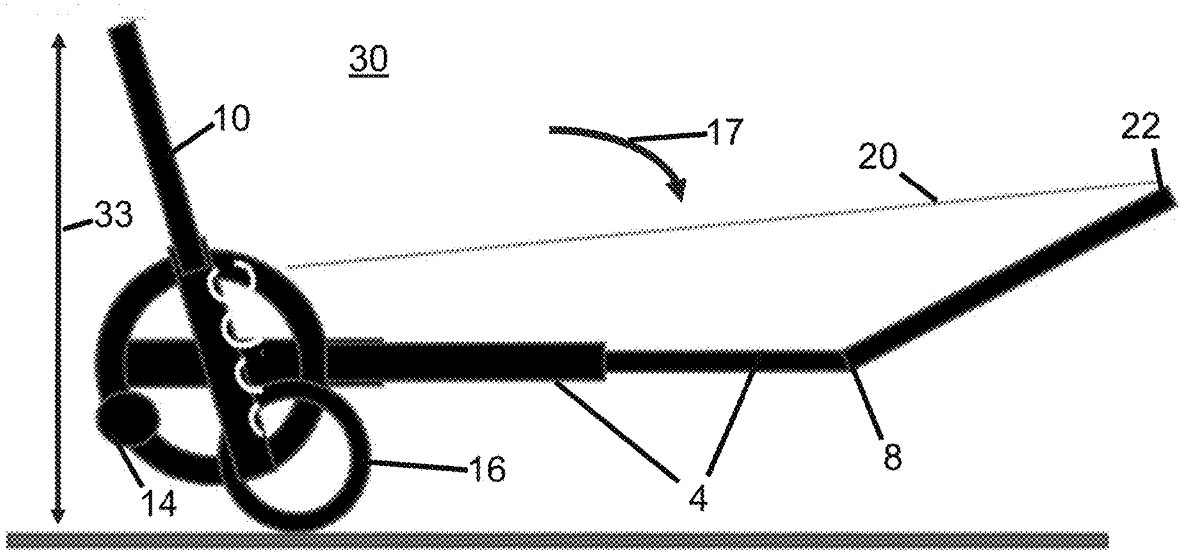
FIG. 1E shows a diagram of a device of the present technology in a patient lifted to chair height (double arrow at 33) position 30 where arc 17 shows motion compared to FIG. 1D.

By pushing or pulling downwards on the effort leverage arms 4, the load leverage arms 10 can be brought to greater heights. This will lift patients to bed heights, commode heights, and more. As will be discussed below, the leverage can also be used to lower patients, for example, into a swimming pool. FIG. 1E shows a diagram of a device of the present technology in a patient lifted to bed height (double arrow at 33) position 30 where arc 17 shows motion compared to FIG. 1D and the device is now resting on the second lifting wheels 16 with the effort handle hinge about in contact (or moving towards contact) with the floor. Bed height is in a range from about 22 inches (55.88 cm) to about 28 inches (71.12 cm) or about 25 inches (63.5 cm).

Figure 2A:
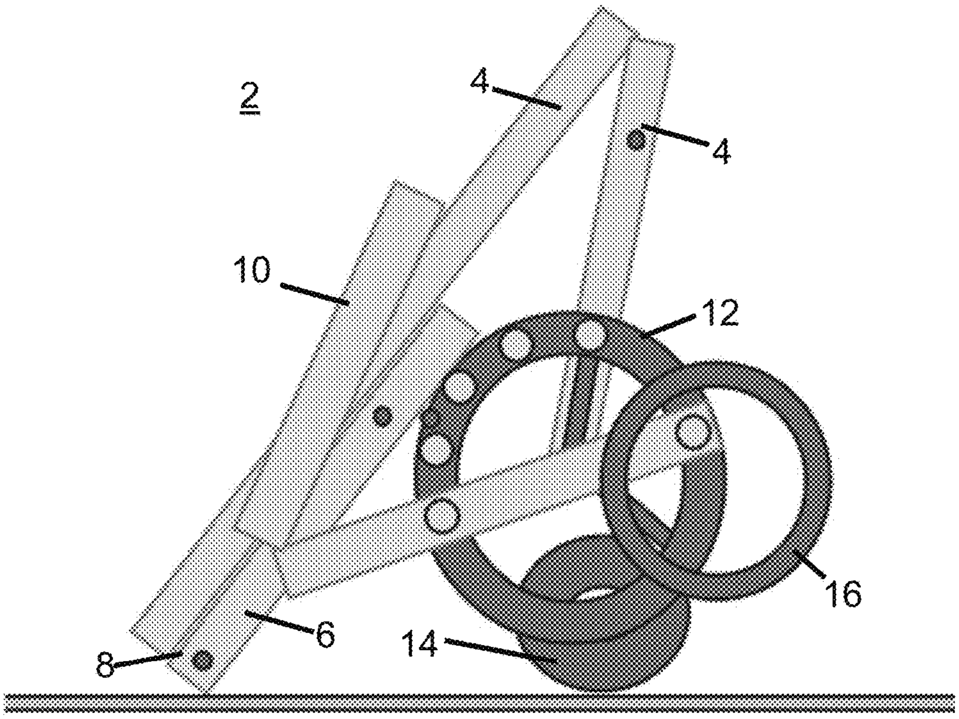
FIG. 2A shows a diagram of a device of the present technology in a folded device 2 configuration with effort leverage arms 4 (folded) and load leverage arms 10 (folded).

According to some aspects, in place of using telescoping rods for construction, folding beams or rods can also be used either in combination or entirely with telescoping or nesting rods/bars. FIG. 2A shows a diagram of a device of the present technology in a folded device 2 configuration with effort leverage arms 4 (folded), adjustable effort handle 6, effort handle hinge 8, load leverage arms 10 (folded), wheel fulcrum 12, first lifting wheels 14, and second lifting wheels 16. It is important to note the diagram is a side view and corresponding wheels are not visible on the other side.

Figure 2B:
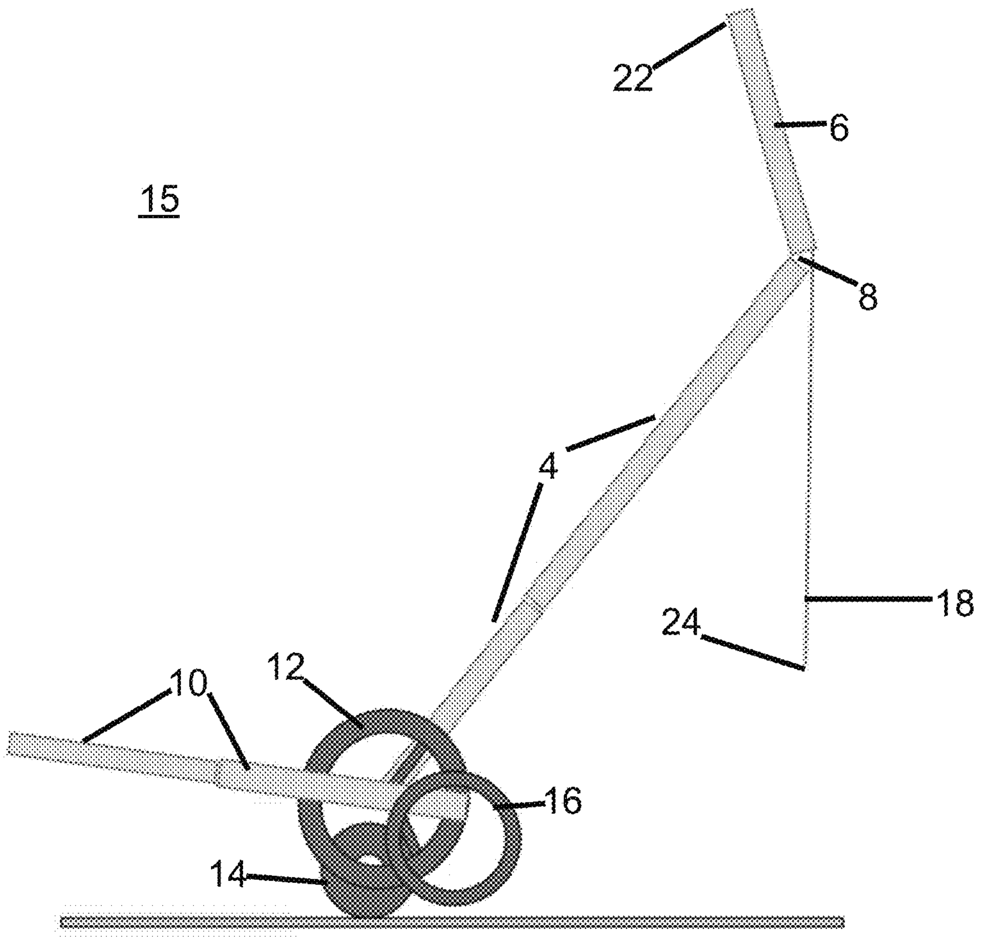
FIG. 2B shows a diagram of a device of the present technology in an unfolded patient lifting position 15.
Figure 2C:
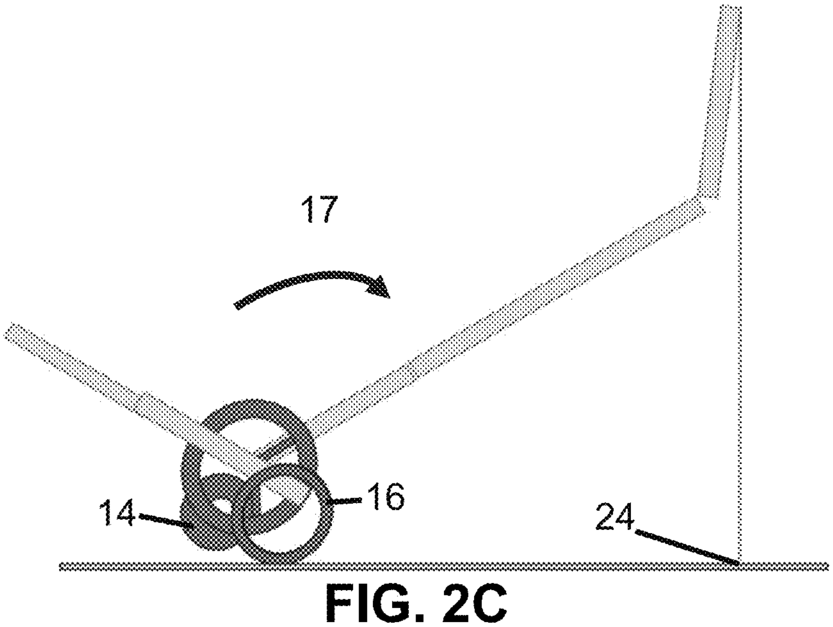
FIG. 2C shows a diagram of a device of the present technology as it is being moved along arc 17 to transition weight to second lifting wheels 16 and foot loop 24 is being pulled to the floor.
Figure 2D:
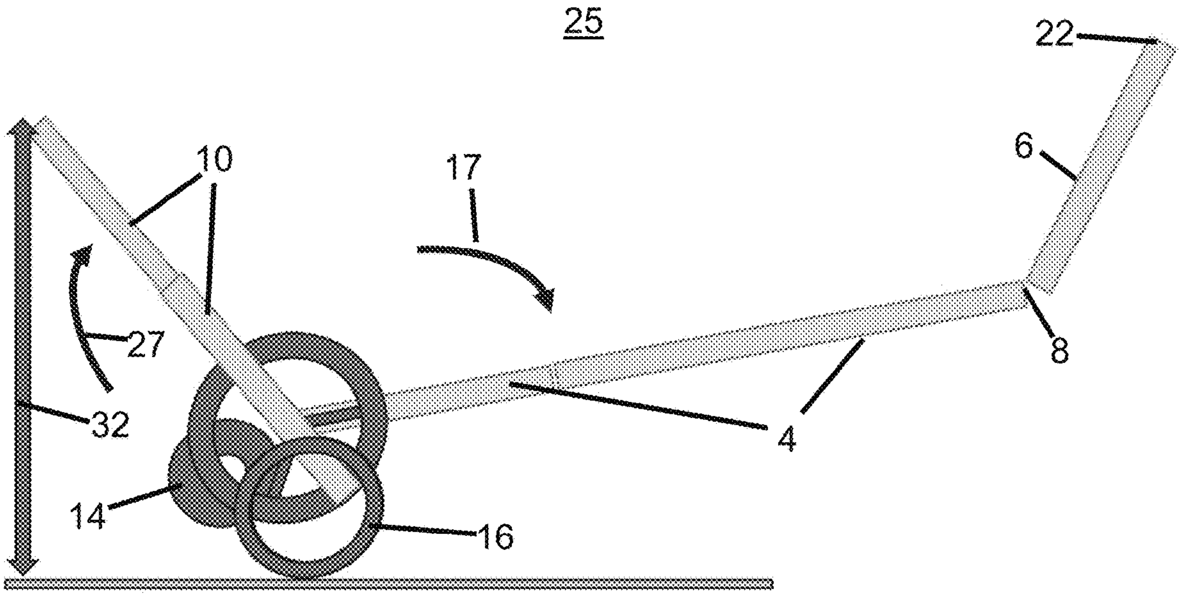
FIG. 2D shows a diagram of a device of the present technology in a 25 patient lifted to chair height position.

The effort handle hinge can include various locking positions or ratcheting positions. FIG. 2B shows a diagram of a device of the present technology in an unfolded patient lifting position 15 with effort leverage arms 4, adjustable effort handle 6, effort handle hinge 8, load leverage arms 10, wheel fulcrum 12, a first lifting wheel 14, second lifting wheel 16, foot cable 18, foot loop 24, and cable pully 22. FIG. 2C shows a diagram of a device of the present technology as it is being moved along arc 17 to transition weight to second lifting wheels 16 and foot loop 24 is being pulled to the floor. By pulling or pushing down on the effort leverage arms, larger amounts of weight can be lifted at the load leverage arms. FIG. 2D shows a diagram of a device of the present technology in a patient lifted to chair height position 25 where arc 17 shows a lever motion compared to FIG. 2C and the device is now resting on the second lifting wheels 16. The chair height is illustrated by the double arrow at 32. Chair height is in a range from about 14 inches (35.56 cm) to about 22 inches (55.88 cm) or about 18 inches (45.72 cm).

Figure 2E:
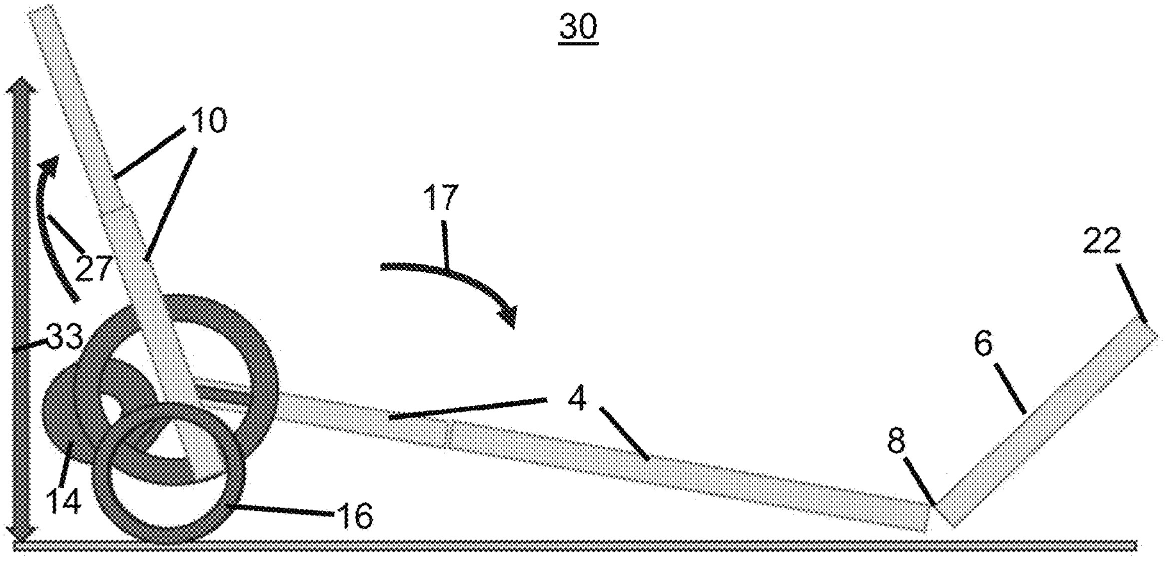
FIG. 2E shows a diagram of a device of the present technology in a 30 patient lifted to bed height position.

In some embodiments, FIG. 2E shows a diagram of a device of the present technology in a patient lifted to bed height position 30 where arc 17 shows a lever motion compared to FIG. 2D and the device is now resting on the second lifting wheels 16 with the effort hand hinge in contact (or about in contact) with the floor. The bed height is illustrated by double arrow 33. Bed height is in a range from about 22 inches (55.88 cm) to about 28 inches (71.12 cm) or about 25 inches (63.5 cm).

Figure 3A:
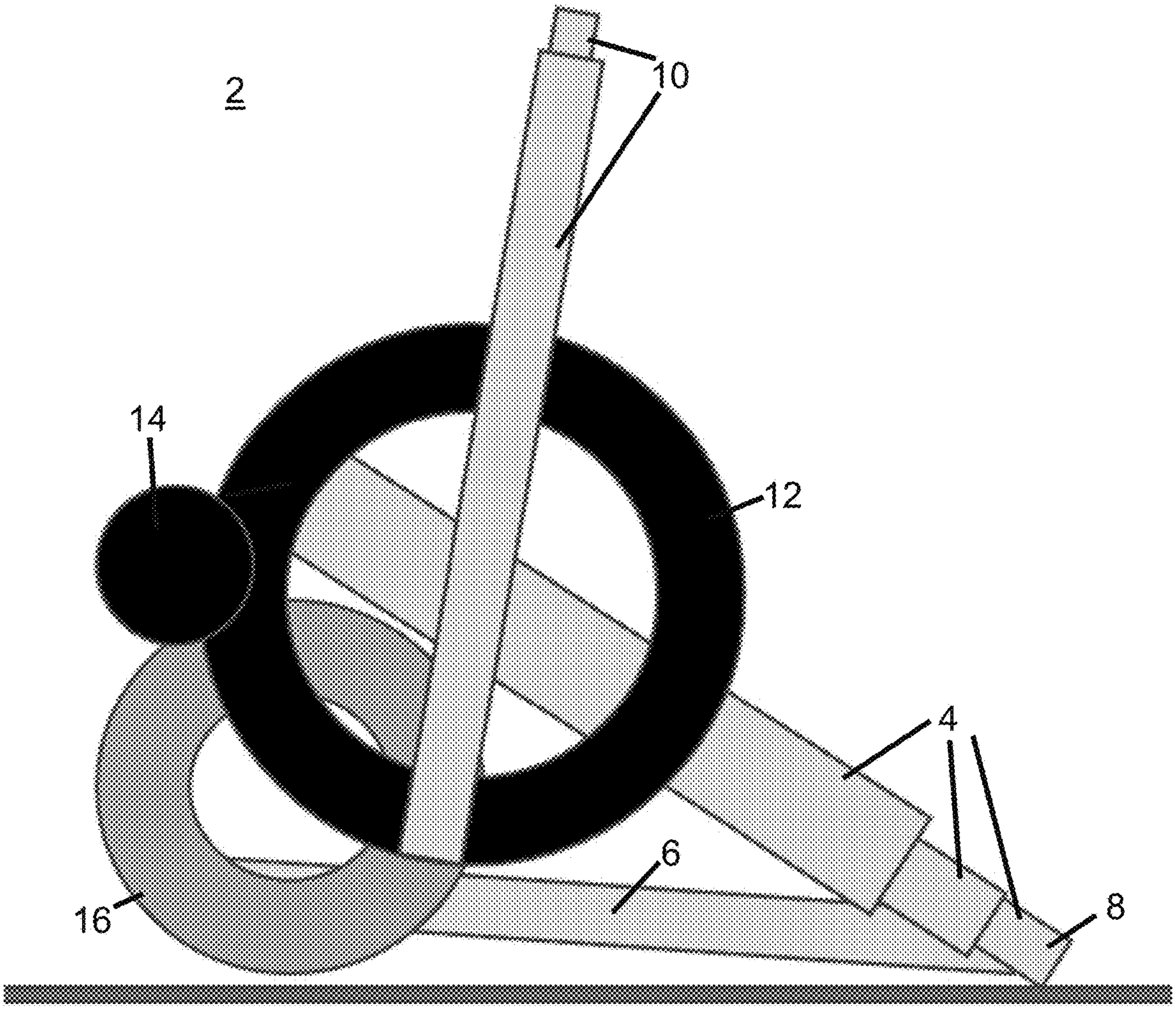
FIG. 3A shows a diagram of a device of the present technology in a folded device 2 configuration with effort leverage arms 4 (telescopically compressed), adjustable effort handle 6, effort handle hinge 8, and load leverage arms 10 (telescopically compressed).

According to some aspects, FIG. 3A shows a diagram of a device of the present technology in a folded device 2 configuration with effort leverage arms 4 (telescopically compressed), adjustable effort handle 6, effort handle hinge 8, load leverage arms 10 (telescopically compressed), wheel fulcrum 12, first lifting wheels 14, and second lifting wheels 16. It is important to note the diagram is a side view and corresponding wheels are not visible on the other side. The prototype diagram shown in FIG. 3A has been constructed.

Figure 3B:
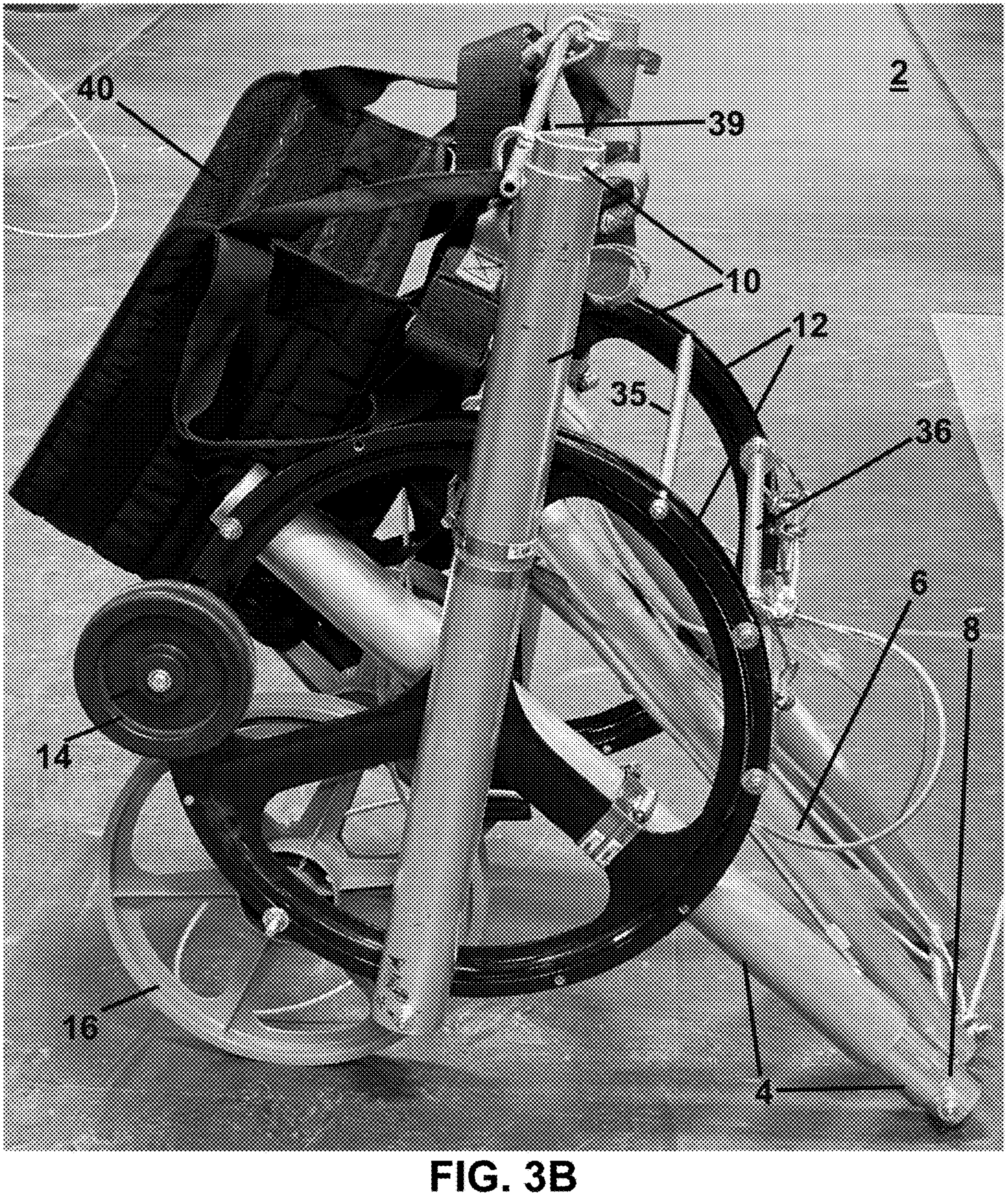
FIG. 3B shows a photo of a device of the present technology in a folded device 2 configuration with effort leverage arms 4 (telescopically compressed), adjustable effort handle 6, effort handle hinge 8, and load leverage arms 10 (telescopically compressed).

Showing a working example of a device, FIG. 3B shows a photo of a device of the present technology in a folded device 2 configuration with effort leverage arms 4 (telescopically compressed), adjustable effort handle 6, effort handle hinge 8, load leverage arms 10 (telescopically compressed), wheel fulcrums 12, first lifting wheels 14, and second lifting wheels 16. It is important to note the photo is a side view and not all corresponding wheels are always visible on the other side. Also shown are fulcrum crossbar 35, fulcrum crossbar 36, patient gait belt 39, and patient knee support 40 (or transfer sling 40).

Figure 3C:
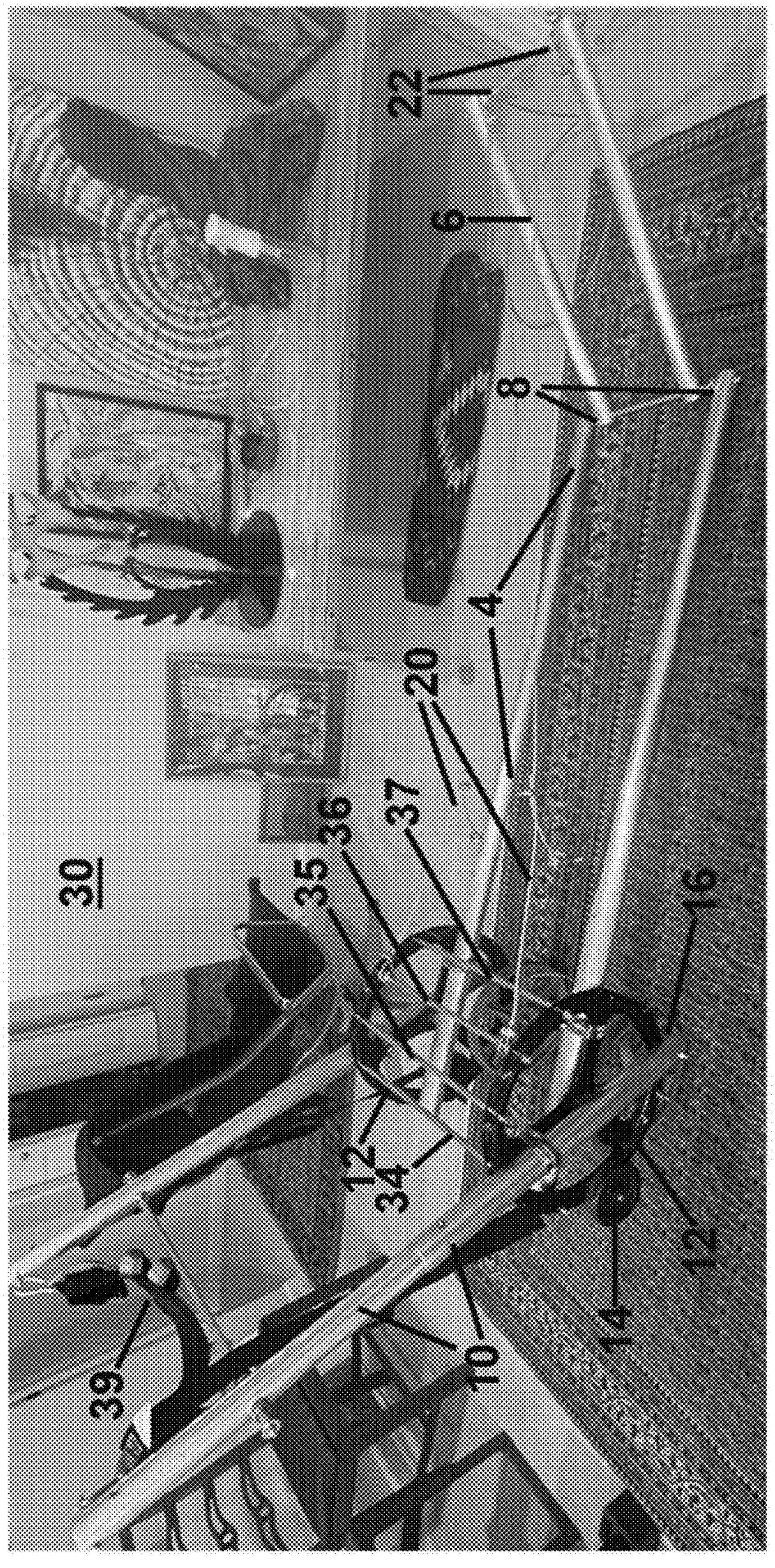
FIG. 3C shows a photo of a device present technology in a bed height 30 position and showing a patient gait belt 39.

In a wider view of a device, according to some aspects, FIG. 3C shows a photo of a device present technology in a bed height 30 position with effort leverage arms 4, adjustable effort handle 6, effort handle hinge 8 (hinge 8 is in contact with the floor), load leverage arms 10, wheel fulcrums 12, first lifting wheels 14, second lifting wheels 16, lifting cable 20, cable pully 22, fulcrum crossbar 34, fulcrum crossbar 35, fulcrum crossbar 36, fulcrum crossbar 37, and patient gait belt 39.

Figure 3D:
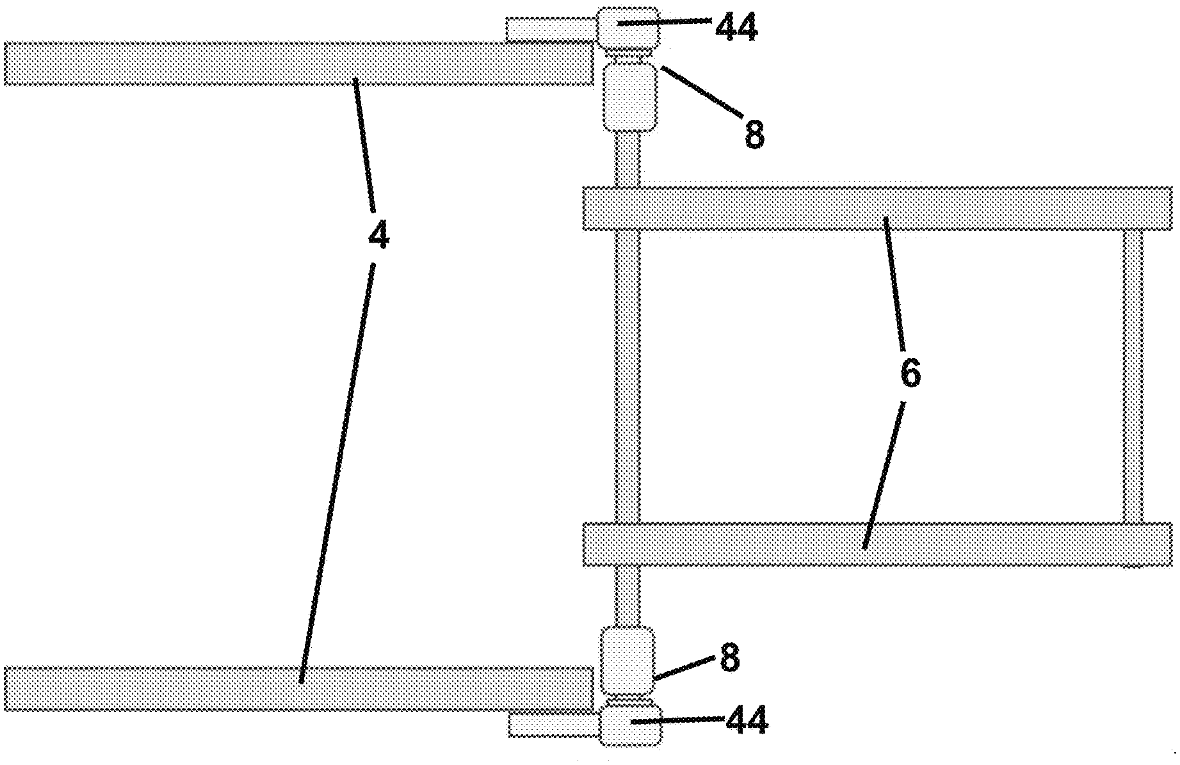
FIG. 3D shows a diagram of an embodiment of the present technology wherein effort handle hinge 8 includes one or more ratchets 44 or one-way ratchets 44.
Figure 3E:
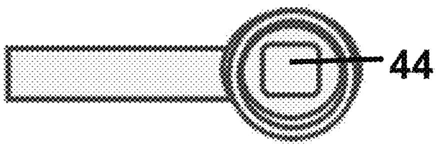
FIG. 3E shows a diagram of a ratchet 44.

In some embodiments, FIG. 3D shows a diagram of an embodiment of the present technology wherein effort handle hinge 8 includes one or more ratchets 44 or one-way ratchets 44. According to some aspects, FIG. 3E shows a diagram of a ratchet 44. In some embodiments, the ratchet 44 can be a one-way ratchet or can have a switch to allow a user to move it to any position for leverage.

Figure 3F:
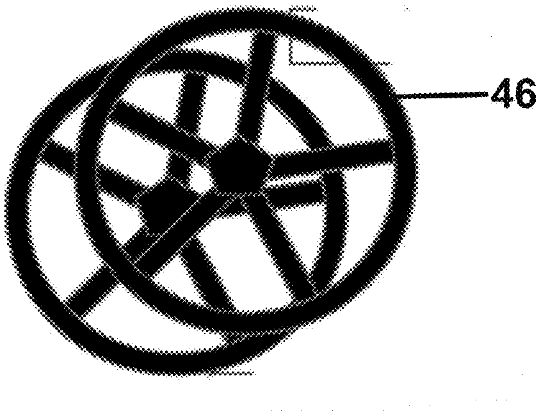
FIG. 3F shows a diagram of bicycle wheels 46 that can be used for a wheel fulcrum.
Figure 3G:
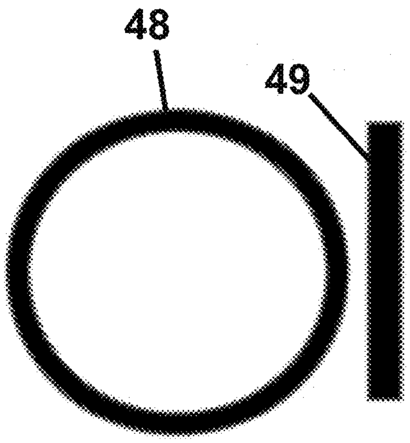
FIG. 3G shows a diagram of carbon fiber wheels 38, and a carbon spoke 49.
Figure 3H:
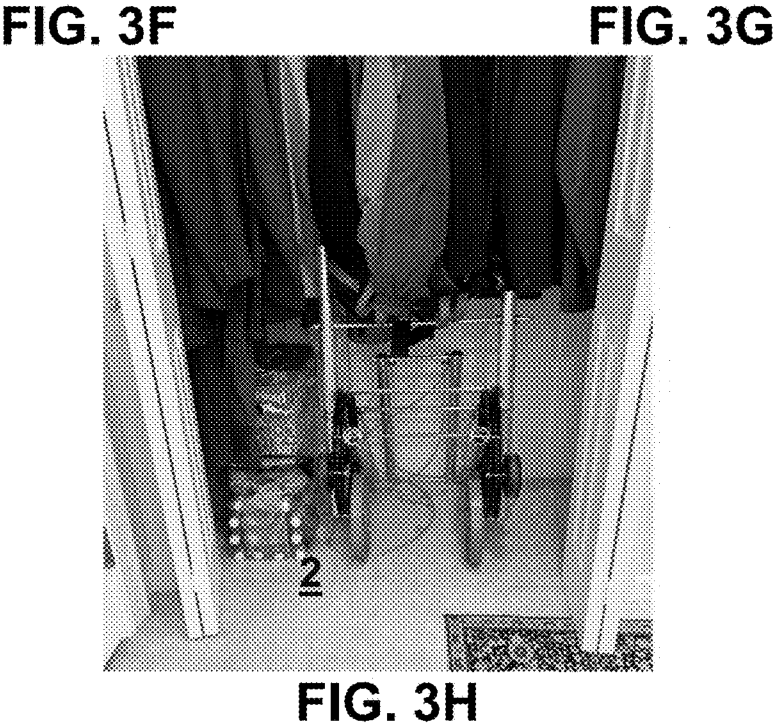
FIG. 3H shows a photo of a device of the present technology in a folded device 2 configuration and stored easily in a foyer area closet underneath hanging jackets in the closet.

As used in some prototype embodiments, FIG. 3F shows a diagram of bicycle wheels 46 that can be used for a wheel fulcrum. FIG. 3G shows a diagram of carbon fiber wheels 38, and a carbon spoke 49. In an embodiment, FIG. 3H shows a photo of a device of the present technology in a folded device 2 configuration and stored easily in a foyer area closet, stored underneath jackets.

Figure 3I:
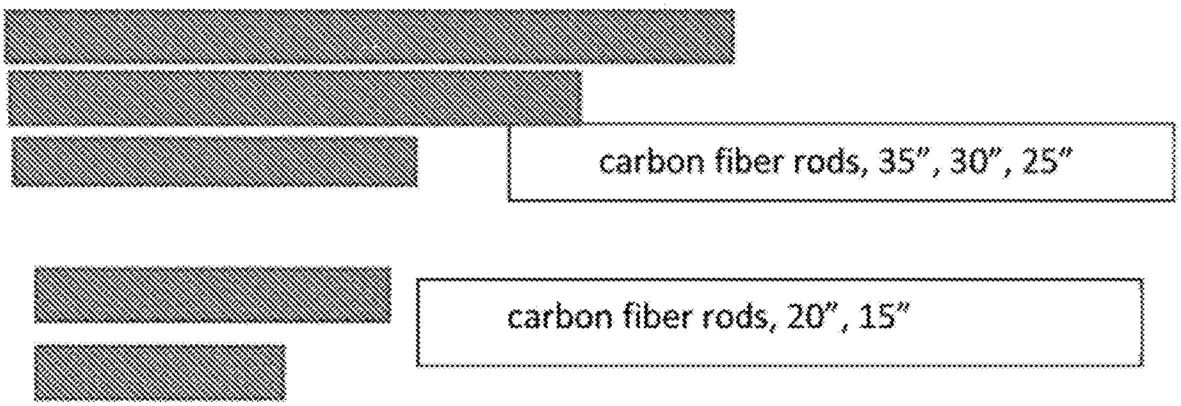
FIG. 3I shows examples of some carbon fiber (nested) rod lengths used for making the devices including carbon fiber rods of about 15 inches, about 20 inches, about 25 inches, about 30 inches, and about 35 inches in length.

In a non-limiting example, FIG. 3I shows examples of some carbon fiber (nested) rod lengths used for making the devices including carbon fiber rods of about 15 inches, about 20 inches, about 25 inches, about 30 inches, and about 35 inches in length.

To begin illustrating the many ways of using the embodiments of the device described above, FIG. 4A shows a diagram of a fallen patient 50 in need of help on the floor. FIG. 4B shows a diagram of an operator 55 helping a patient 50 from the floor to a sitting on the floor position. FIG. 4C shows a diagram of an operator 55 preparing to use foot loop 24 to lift a patient 50 from the floor with a device of the presently disclosed technology. FIG. 4D shows a diagram of an operator 55 having just used foot loop 24 to lift a patient 50 from the floor. FIG. 4E shows a diagram of an operator 55 rolling a lifted patient 50 towards a chair. FIG. 4F shows a diagram of an operator 55 having just placed a patient 50 onto a chair 60 and preparing to re-lift the patient 50 to a bed. According to some aspects, FIG. 4G shows a diagram of an operator 55 rolling a lifted patient 50 to a bed 65. It is important to note that the device can be used for safely lifting patients to secure locations. For example, FIG. 4H shows a diagram of an operator 55 rolling a lifted patient 50 to a wheelchair 70.

Patients can also be safely lowered. FIG. 4I shows a diagram of an operator 55 preparing to lower a patient 50 from a deck 74 of a swimming pool into the water of a swimming pool 75. FIG. 4J shows a diagram of an operator 55 lowering a patient 50 into the water of a swimming pool 75. In FIG. 4J and FIG. 4K, the patient 50 is moving down into the pool as indicated by arrow 27 while the operator 55 is moving the effort leverage arms upwards as indicated by arrow 17. The device forms a double fulcrum at first lifting wheels 14.

Figure 5A:
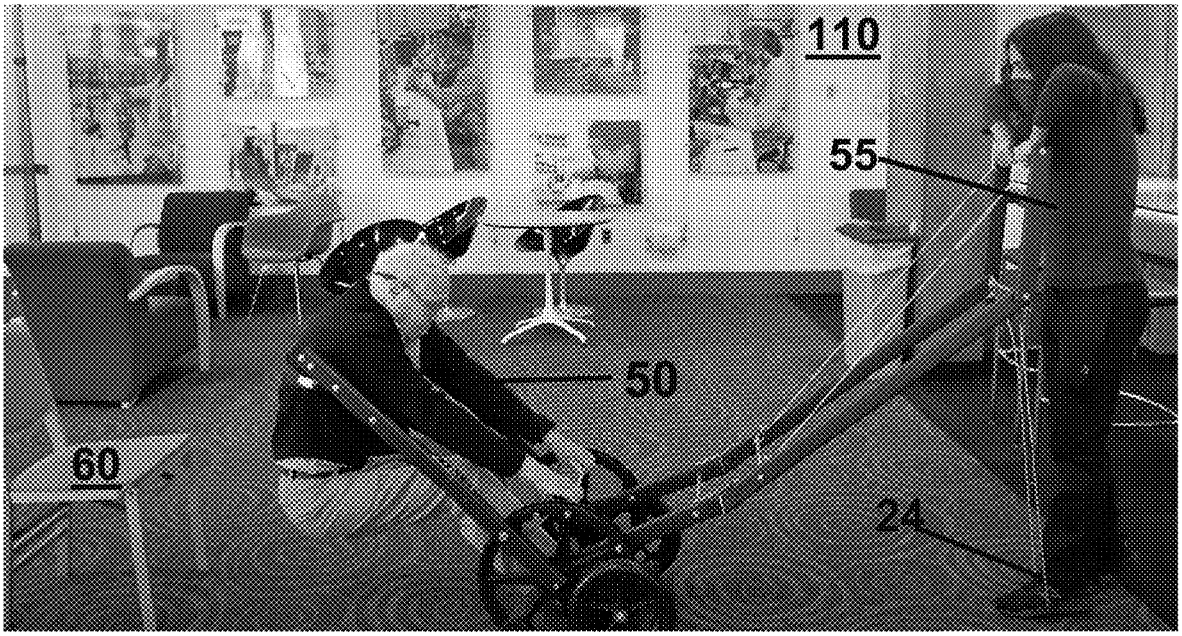
FIG. 5A shows a photo 110 of an operator just lifting a patient from the floor by using a foot loop at 24.
Figure 5B:
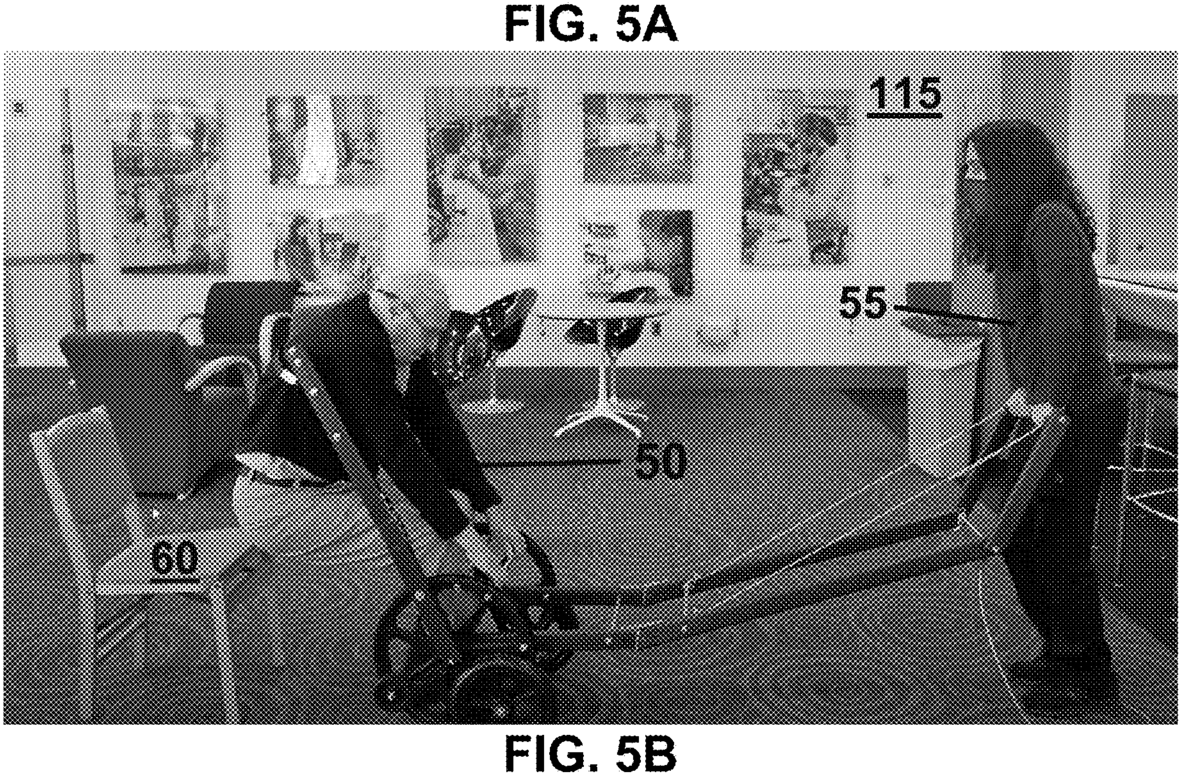
FIG. 5B shows a photo 115 of an operator rolling a patient to be positioned over a chair.
Figure 6A:
FIG. 6A shows a photo of operator 55 lifting patient 50 into a chair 60.
Figure 6B:
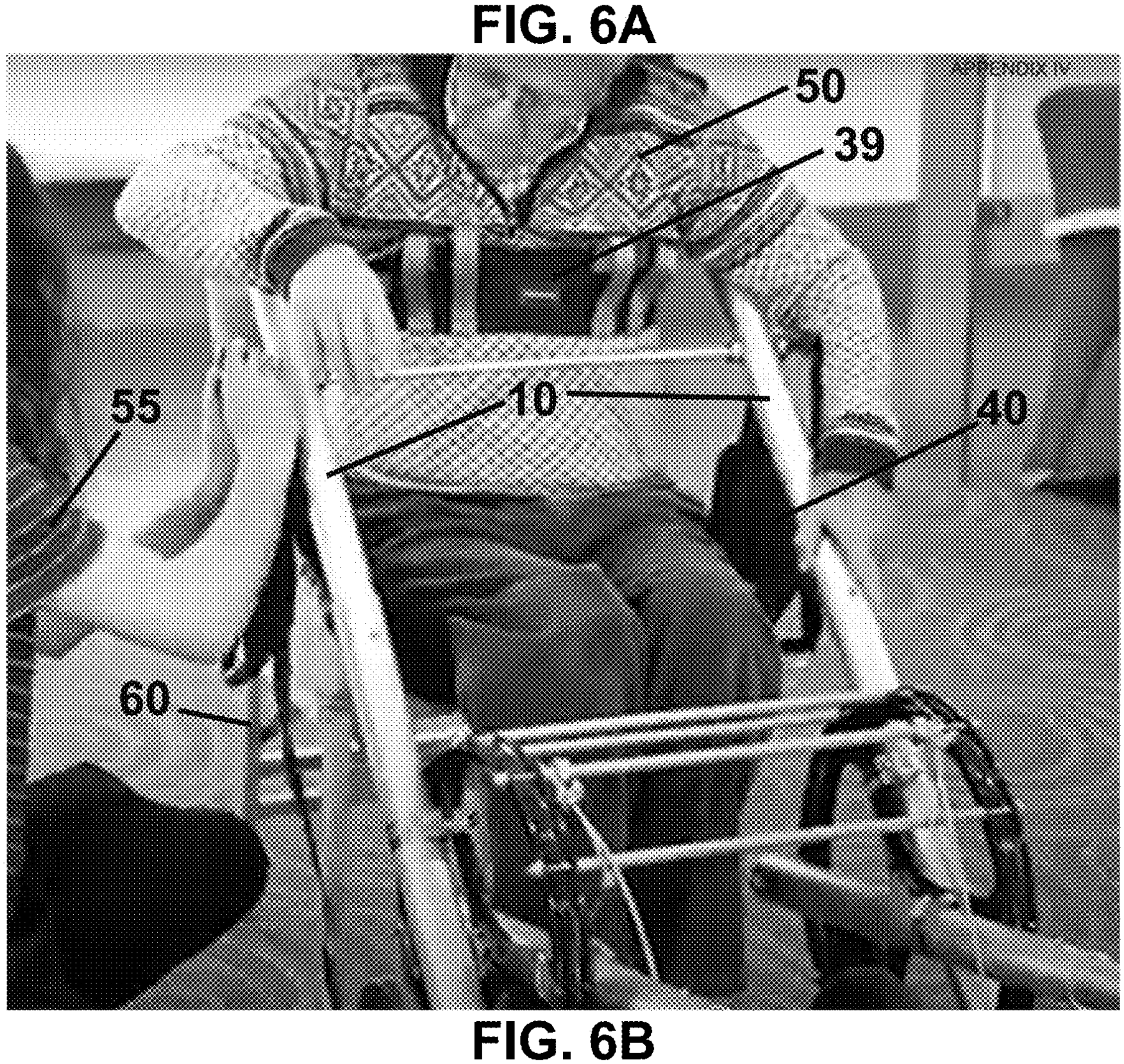
FIG. 6B shows a photo of an operator 55 preparing a patient 50 to be lifted from a chair 60.

In working examples, FIG. 5A shows a photo 110 of an operator 55 just lifting a patient 50 from the floor towards a chair 60 by using a foot loop at 24. FIG. 5B shows a photo 115 of an operator 55 rolling a patient 50 to be positioned over a chair 60. In FIG. 5A and FIG. 5B, the load leverage arms are sufficiently long to lift a patient to a chair, and the patient can reach a fulcrum crossbar for grip. In some embodiments, the load leverage arms can extend to longer lengths. In FIG. 6A, the patient is gripping the load leverage arms because the load leverage arms are longer, and the patient's arms cannot reach the fulcrum crossbar. FIG. 6A shows a photo of operator 55 lifting patient 50 into a chair 60. FIG. 6B shows a photo of an operator 55 preparing a patient 50 to be lifted from a chair 60. In this example, the longer load leverage arms 10 can be useful for lifting the patient to bed heights or commode heights, and the patient cannot reach the fulcrum crossbar (compare to FIG. 5A where the patient can reach the fulcrum crossbar).

Figure 6C:
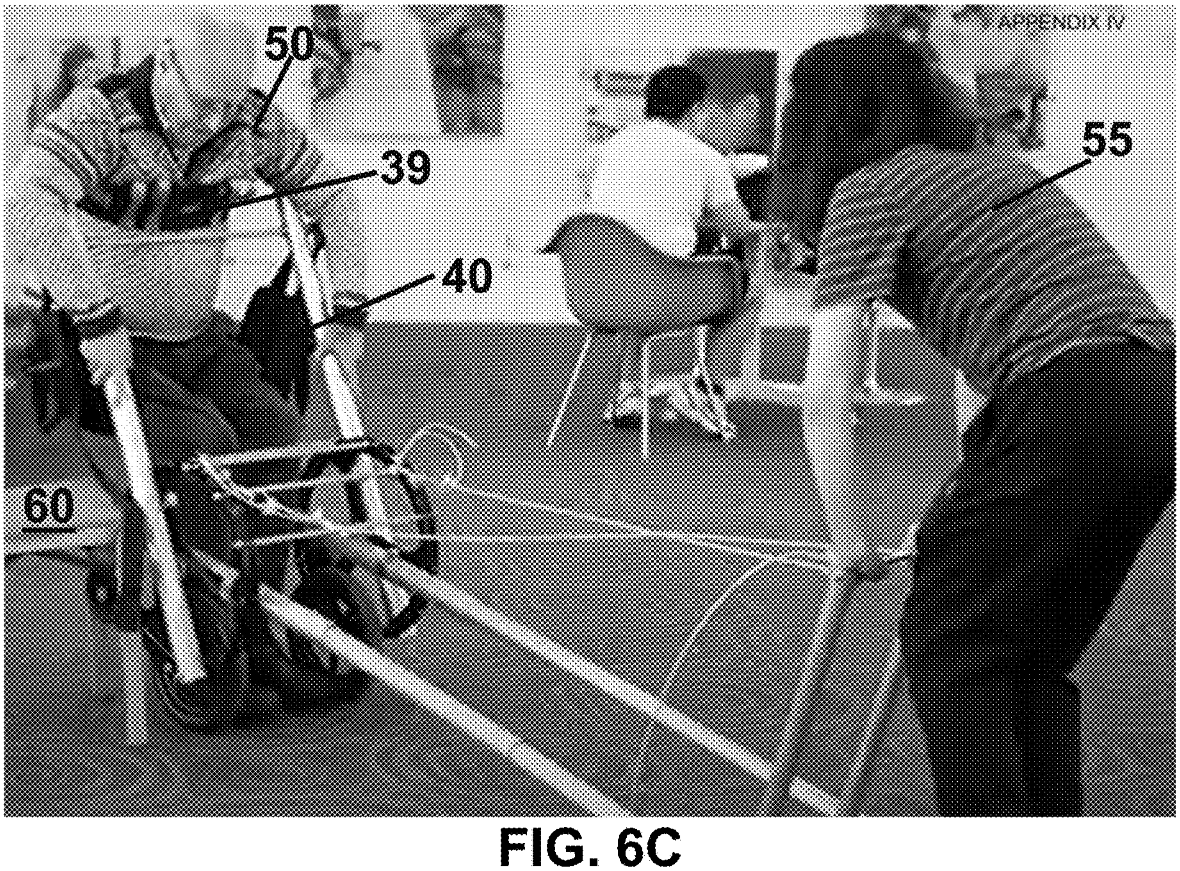
FIG. 6C shows a photo of an operator 55 lifting a patient 50 from a chair 60.

FIG. 6C shows a photo of an operator 55 lifting a patient 50 from a chair 60.

In some embodiments, a safe lifting device configured for a lifting of a fallen patient from a surface and for a transport of the patient is disclosed herein, the device comprising a class 1 lever including: two larger wheels disposed about parallel at a fulcrum of the lever; each of the two larger wheels having a shorter load leverage arm extending radially outward to the patient and a longer effort leverage arm extending radially outward; wherein a lever angle greater than 90° is defined by a crossing of a load leverage arm and an effort leverage arm at the fulcrum; wherein at a terminal end of each effort leverage arm is attached a hinge with an adjustable effort handle capable of accepting a lifting up force or a pulling down force by an operator; wherein each of the larger wheels disposed at the fulcrum includes a smaller rolling wheel attached to each larger wheel by an axle; wherein a lifting up of the longer effort leverage arms will cause a pivot of the two larger wheels to sit upon the two smaller rolling wheels to provide a lowering of a shorter load leverage arm capable to reach the fallen patient; wherein each of the larger wheels disposed at the fulcrum includes a medium rolling wheel attached to each larger wheel by an axle; and wherein a pulling down of the longer effort leverage arms will cause a pivot of the two larger wheels to sit upon the two medium rolling wheels to provide a lifting up of the fallen patient and a raising of the load leverage arm with the medium wheels operative to transport the patient across the surface.

According to some aspects, the safe lifting device is configured wherein a length of the longer arms added with a length to a distal end of the effort handle defines an effort length; wherein a length of the shorter load leverage arms defines a load length; wherein dividing the effort length by the load length defines a mechanical advantage (MA); and wherein the MA is about 200 lb/133 lb=1.5.

It is important to note that the devices disclosed herein can form a "double fulcrum" lever or a "compound lever" because of the pivot of the wheel fulcrum onto the first lifting wheels, for example, when lowering the load leverage arms to a patient. In another example, a double fulcrum or compound lever is formed when the wheel fulcrum is tilted to rest upon the second lifting wheels, for example, when rolling a patient or when lifting a patient to chair, bed, or other heights. In general, the technology herein can provide compound levers that can be constructed from first, second and/or third-order levers using the wheel fulcrum, the first lifting wheels, and the second lifting wheels (along with the adjustable effort handles and load leverage arms). In some embodiments, in the compound levers herein, the force multiplied by the force arm equals the weight multiplied by the weight arm. The output from one lever becomes the input for the next lever in the system, and so the advantage is magnified. It is contemplated that when the device is constructed with sizes outside of the range of normal human use, the MA can be higher.

In some embodiments, the safe lifting device is configured further comprising a cable affixed to a terminal end of the longer effort leverage arm or a terminal end of the adjustable effort handle; the cable comprising a distal configuration operative to accept a foot of the operator for providing an additional pulling down force by the operator.

In some embodiments, the safe lifting device is configured further comprising wherein the two larger wheels are connected together by one or more fulcrum crossbars; wherein each of the one or more fulcrum crossbars is parallel to the fulcrum of the lever.

According to some aspects, the safe lifting device is configured wherein a length of the shorter load leverage arm is in a range from about 60 cm to about 155 cm.

In some embodiments, the safe lifting device is configured wherein a length of the longer arms added with a length to a distal end of the effort handle defines an effort length in a range from about 120 cm to about 310 cm.

According to some aspects, the safe lifting device is configured wherein a diameter of the two larger wheels is in a range from about 30 cm to about 70 cm.

In some embodiments, the safe lifting device is configured wherein the load leverage arms and/or the effort leverage arms include one or more telescoping tubes or beams operative to provide a retracting of the arms for a storage or a transport configuration.

According to some aspects, the safe lifting device is configured wherein the load leverage arms and/or the effort leverage arms include one or more hinges operative to provide a folding of the arms for a storage or a transport configuration.

In some embodiments, the safe lifting device is configured further comprising a gait belt at or near a distal end of the load leverage arms; the gait belt operative to secure a patient at or near the distal end of the load leverage arms for a lifting of the patient.

According to some aspects, the safe lifting device is configured further comprising a knee support harness, a lifting sling, or a transport harness affixed at or near a center of the load leverage arms; the knee support, lifting sling, or transport harness operative to support one or more legs of the patient while or during a lifting of the patient.

In some embodiments, the safe lifting device is configured wherein the hinge further comprises a ratchet disposed at the hinge; the ratchet operative to provide one or more adjustment positions of the adjustable effort handle; and wherein the one or more adjustment positions are capable of providing a greater leverage to the operator, a movement of the effort handle to accommodate a lowering of the patient, a movement of the effort handle to accommodate a lifting of the patient, or a combination thereof.

According to some aspects, the safe lifting device is configured further comprising wherein no force is applied to the device; the device will rest upon the surface with both the smaller rolling wheels and both the larger wheels in contact with the surface; thereby defining a resting or a balanced resting position.

In some embodiments, the safe lifting device is configured wherein the entire device has a weight in a range from about 9 kilograms to about 12 kilograms.

According to some aspects, the safe lifting device is configured further comprising the device is operative to lift the patient from a chair position, with the patient sitting at a height in a range from about 18 in/46 cm to about 28 in/71 cm, to a bed position, with the patient sitting on a bed at a height in a range from about 60 cm to about 80 cm.

In some embodiments, the safe lifting device is configured further comprising the device is operative to lower the patient from a floor position or from a sitting height in a range from about 0 cm to about 40 cm down to a pool position including a swimming pool water level that is lower than the surface or is lower than the sitting height.

According to some aspects, the safe lifting device is configured further comprising the device is operative to extend the load leverage arms to a patient that is sitting at a height in a range from about 35 cm to about 80 cm, to secure to the patient by a use of a gait belt and/or a knee support, lifting sling, or a transport harness, and to lower the patient from the height.

In some embodiments, the safe lifting device is configured wherein the device comprises carbon fiber, aluminum, rubber, foam, magnesium, or a combination thereof.

According to some aspects, the safe lifting device is configured further comprising one or more spokes are included with the larger wheels.

In some embodiments, the safe lifting device is configured wherein the pivot of the two larger wheels to sit upon the two smaller rolling wheels is operative to provide a double fulcrum class 1 lever; wherein the sitting upon the two smaller wheels provides a greater mechanical advantage than the fulcrum of the lever that is not sitting upon the two smaller rolling wheels.

According to some aspects, the safe lifting device is configured wherein the pivot of the two larger wheels to sit upon the medium rolling wheels is operative to provide a double fulcrum class 1 lever; wherein the sitting upon the two medium rolling wheels provides a greater mechanical advantage than the fulcrum of the lever that is not sitting upon the two smaller wheels.

In some embodiments, the safe lifting device is configured further comprising wherein the two larger wheels are connected together by three or more fulcrum crossbars; wherein each of the one or more fulcrum crossbars is parallel to the fulcrum of the lever.

According to some aspects, the safe lifting device is configured further comprising a pulley affixed to the adjustable effort handle and a cable affixed to the pulley; the cable comprising a foot loop operative to accept a foot of the operator and to a apply a partial or a full weight of the operator to the class 1 lever.

In some embodiments, the safe lifting device is configured wherein the lever angle is in a range from about 100° to about 160°.

According to some aspects, a method for a safe lifting of a fallen patient from a surface to a chair height, a bed height, a wheelchair height, or a commode height is disclosed herein, the method comprising the steps of: step (1) obtaining a device comprising a class 1 lever including: two larger wheels disposed about parallel at a fulcrum of the lever; each of the two larger wheels having a shorter load leverage arm extending radially outward to the patient with a gait belt and a longer effort leverage arm extending radially outward; wherein a lever angle greater than 90° is defined by a crossing of a load leverage arm and an effort leverage arm at the fulcrum; wherein at a terminal end of each effort leverage arm is attached a hinge with an adjustable effort handle capable of accepting a lifting up force or a pulling down force by an operator; wherein each of the larger wheels disposed at the fulcrum includes a smaller rolling wheel attached to each larger wheel by an axle; wherein a lifting up of the longer effort leverage arms will cause a pivot of the two larger wheels to sit upon the two smaller rolling wheels to provide a lowering of a shorter load leverage arm capable to reach the fallen patient; wherein each of the larger wheels disposed at the fulcrum includes a medium rolling wheel attached to each larger wheel by an axle; wherein a pulling down of the longer effort leverage arms will cause a pivot of the two larger wheels to sit upon the two medium rolling wheels to provide a lifting up of the fallen patient and a raising of the load leverage arm with the medium wheels operative to transport the patient across the surface; step (2) affixing the gait belt to the patient or to a chest area of the patient; step (3) pulling down the longer effort leverage arms; whereby a lifting up of the fallen patient from the surface to a height is provided.

In some embodiments, the method is executed further comprising the step of: (4) rolling the device with the patient on the two medium rolling wheels to a chair, a bed, a wheelchair, or a commode.

According to some aspects, the method is executed wherein the device further comprises a cable affixed to a terminal end of the longer effort leverage arm or a terminal end of the adjustable effort handle; the cable comprising a distal configuration operative to accept a foot of the operator for providing an additional pulling down force by the operator; and wherein step (3) further comprises: placing an operator's foot into the distal configuration and applying a greater pulling down by a use of a whole of the operator's weight.

In some embodiments, the method is executed further comprising wherein a length of the longer arms added with a length to a distal end of the effort handle defines an effort length; wherein a length of the shorter load leverage arms defines a load length; wherein dividing the effort length by the load length defines a mechanical advantage (MA); and wherein the MA during an execution of the method is in a range from approximately 1.5.

According to some aspects, the method is executed wherein the load leverage arms and/or the effort leverage arms include one or more telescoping tubes or beams operative to provide a retracting of the arms for a storage or a transport configuration; and wherein the method further comprises the step of: unfolding or expanding one or more arms of the device.

In some embodiments, the safe lifting device is configured wherein the load leverage arms and/or the effort leverage arms include one or more hinges operative to provide a folding of the arms for a storage or a transport configuration; and wherein the method further comprises the step of: unfolding or expanding one or more arms of the device.

According to some aspects, the method is executed wherein the safe lifting device is further comprising a knee support harness, a lifting sling, or a transport harness affixed at or near a center of the load leverage arms; the knee support, lifting sling, or transport harness operative to support one or more legs of the patient while or during a lifting of the patient; and wherein the method further comprises the step of securing the knee support, lifting sling, or transport harness underneath a leg of the patient.

In some embodiments, the method is executed wherein the hinge further comprises a ratchet disposed at the hinge; the ratchet operative to provide one or more adjustment positions of the adjustable effort handle; and wherein the one or more adjustment positions are capable of providing a greater leverage to the operator, a movement of the effort handle to accommodate a lowering of the patient, a movement of the effort handle to accommodate a lifting of the patient, or a combination thereof; and wherein the method further comprises the step of: adjusting the ratchet to achieve a greater leverage by the operator.

According to some aspects, the method above is executed further comprising the step of: (5) lowering the patient to a lower surface, a chair, a bed, a wheelchair, or a commode. In some embodiments, the method above is executed further comprising the step of: (2b) ensuring the patient holds on to the device at or near the fulcrum or on one or more of the load leverage arms.

In some embodiments, the method above is executed wherein the safe lifting device is further comprising wherein the two larger wheels are connected together by one or more fulcrum crossbars; wherein each of the one or more fulcrum crossbars is parallel to the fulcrum of the lever; and wherein the method further comprises the step of ensuring the patient holds on to the device at one or more of the fulcrum crossbars.

According to some aspects, a kit configured for sale is disclosed herein, the kit comprising: a safe lifting device configured for a lifting of a fallen patient from a surface and a transport of the patient, the device comprising a class 1 lever including: two larger wheels disposed about parallel at a fulcrum of the lever; each of the two larger wheels having a shorter load leverage arm extending radially outward to the patient and a longer effort leverage arm extending radially outward; wherein a lever angle greater than 90° is defined by a crossing of a load leverage arm and an effort leverage arm at the fulcrum; wherein at a terminal end of each effort leverage arm is attached a hinge with an adjustable effort handle capable of accepting a lifting up force or a pulling down force by an operator; wherein each of the larger wheels disposed at the fulcrum includes a smaller rolling wheel attached to each larger wheel by an axle; wherein a lifting up of the longer effort leverage arms will cause a pivot of the two larger wheels to sit upon the two smaller rolling wheels to provide a lowering of a shorter load leverage arm capable to reach the fallen patient; wherein each of the larger wheels disposed at the fulcrum includes a medium rolling wheel attached to each larger wheel by an axle; and wherein a pulling down of the longer effort leverage arms will cause a pivot of the two larger wheels to sit upon the two medium rolling wheels to provide a lifting up of the fallen patient and a raising of the load leverage arm with the medium wheels operative to transport the patient across the surface.

In any interpretation of the claims appended below, it is noted that no claims or claim elements are intended to invoke or be interpreted under 35 U.S.C. 112 (f) unless the words “means for” or “step for” are explicitly used in the particular claim.

In general, any combination of disclosed features, components and methods described herein is possible. Steps of a method can be performed in any order that is physically possible.

All cited references are incorporated by reference herein. Although embodiments have been disclosed, it is not desired to be limited thereby. Rather, the scope should be determined only by the appended claims.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. The methods, kits, formulations, and devices disclosed herein can be combined in any way into systems to address the current public health emergency.

Any ranges cited herein can be re-stated by using any point with a range as an endpoint for a new range. All points within a range are subsumed within a range.

The technology described herein is further illustrated by the following examples which in no way should be construed as being further limiting. The Examples are provided to demonstrate examples of future planned work, which in some experiments is emergency work. Although methods and materials similar or equivalent to those described herein can be used in the practice or testing of this disclosure, suitable methods and materials are described below.

EXAMPLES

The invention now being generally described, it will be more readily understood by reference to the following examples which are included merely for purposes of illustration of certain aspects and embodiments of the present invention and are not intended to limit the invention.

Example 1. Manufacture of Patient Moving Devices

Devices were made out of various materials including carbon fiber, magnesium, aluminum, and steel (in earlier prototypes). For example, FIG. 5B and FIG. 6A show photos of actual models used. Folding configuration and various belts were tested as shown on the models in FIG. 3B and in FIG. 3C. Ratchets were tested at hinge positions on the devices for best leverage for the operators (e.g., FIG. 3D and FIG. 3E). Various sizes and compositions for wheels have been tested (e.g., FIG. 3F and FIG. 3G).

Example 2. Repeated Testing of Patient Moving, Lifting, and Transport

Figure 4A:
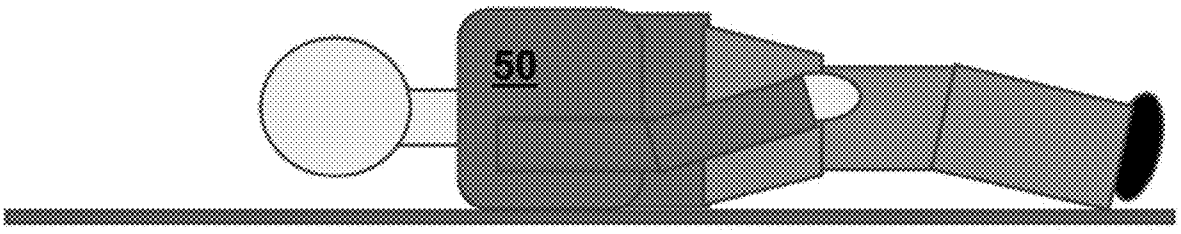
FIG. 4A shows a diagram of a fallen patient 50 in need of help on the floor.
Figure 4B:
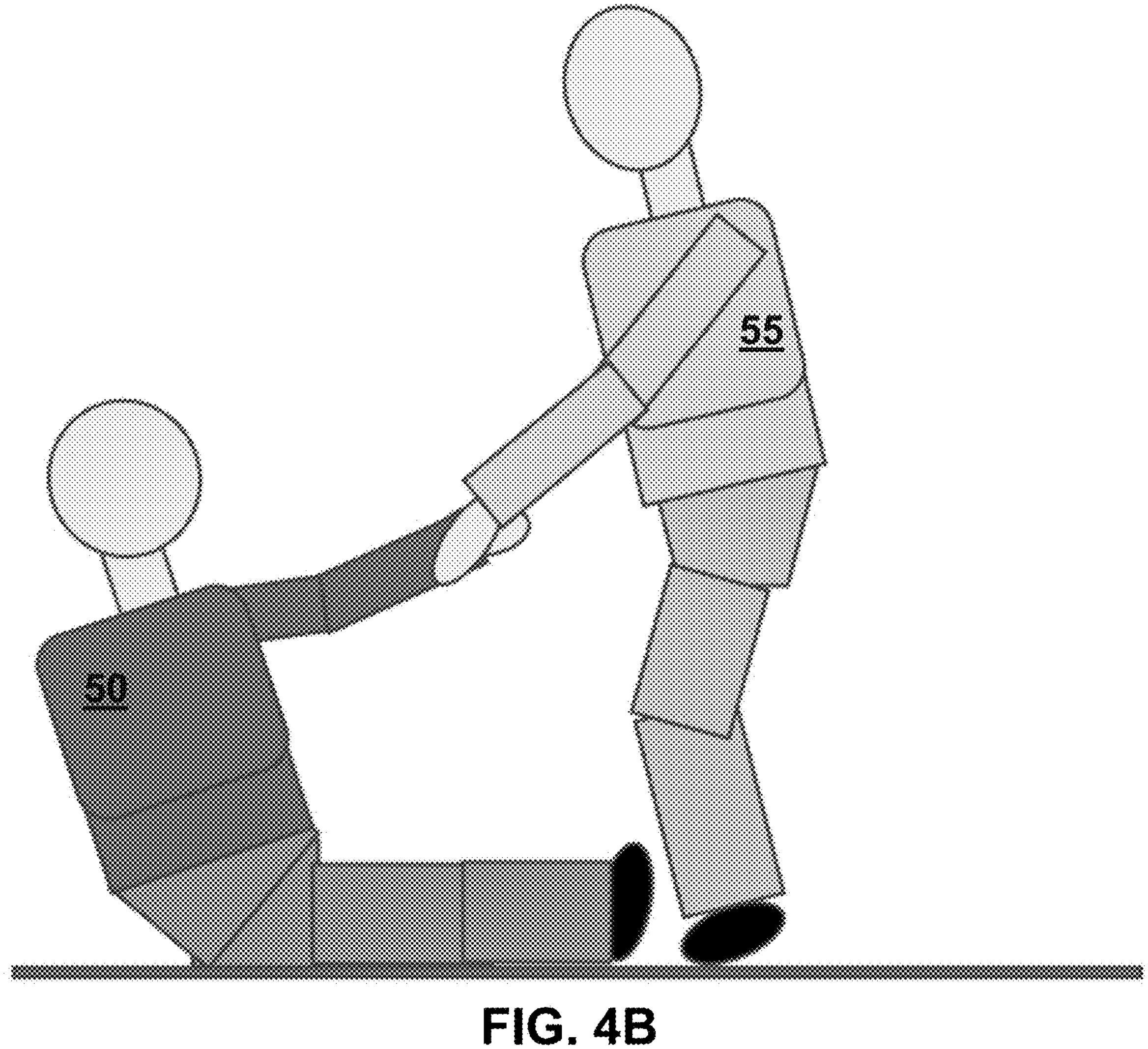
FIG. 4B shows a diagram of an operator 55 helping a patient 50 from the floor to a sitting on the floor position.
Figure 4C:
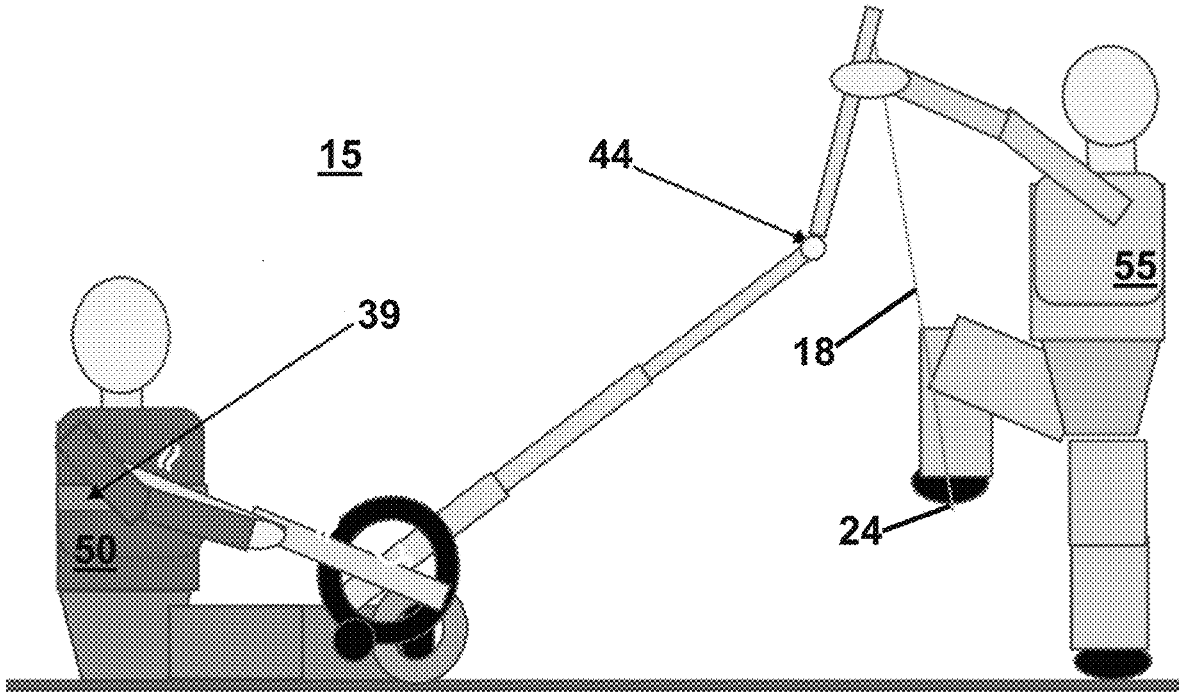
FIG. 4C shows a diagram of an operator 55 preparing to use foot loop 24 to lift a patient 50 from the floor with a device of the presently disclosed technology.
Figure 4D:
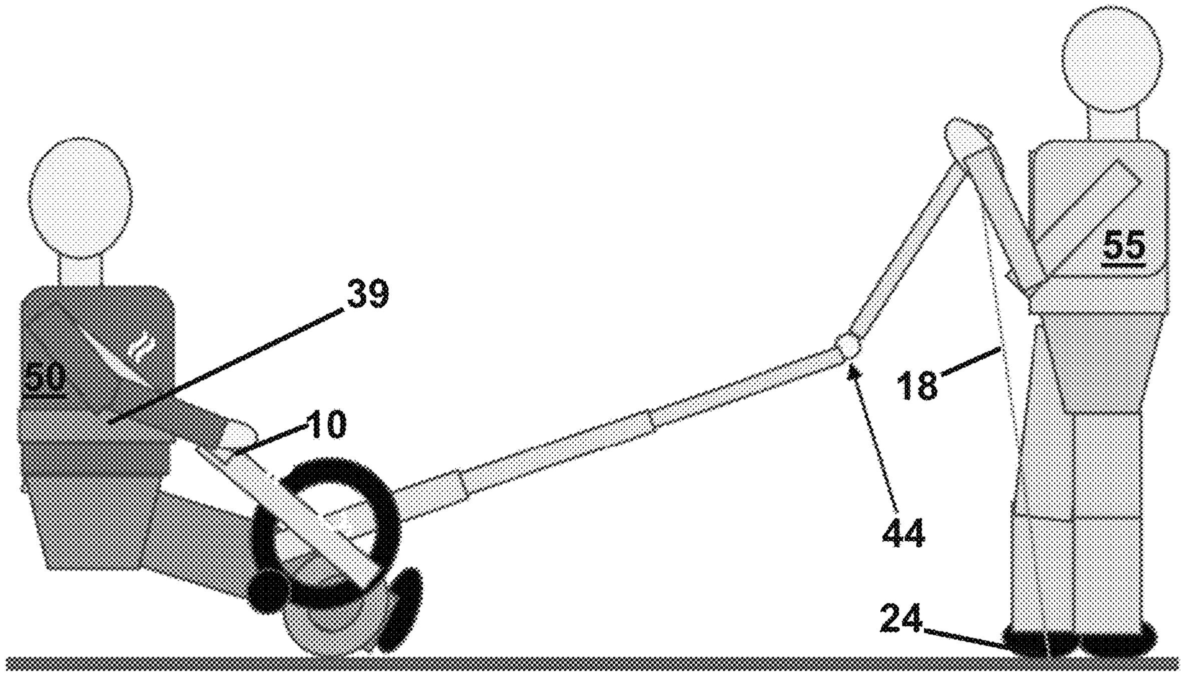
FIG. 4D shows a diagram of an operator 55 having just used foot loop 24 to lift a patient 50 from the floor.
Figure 4E:
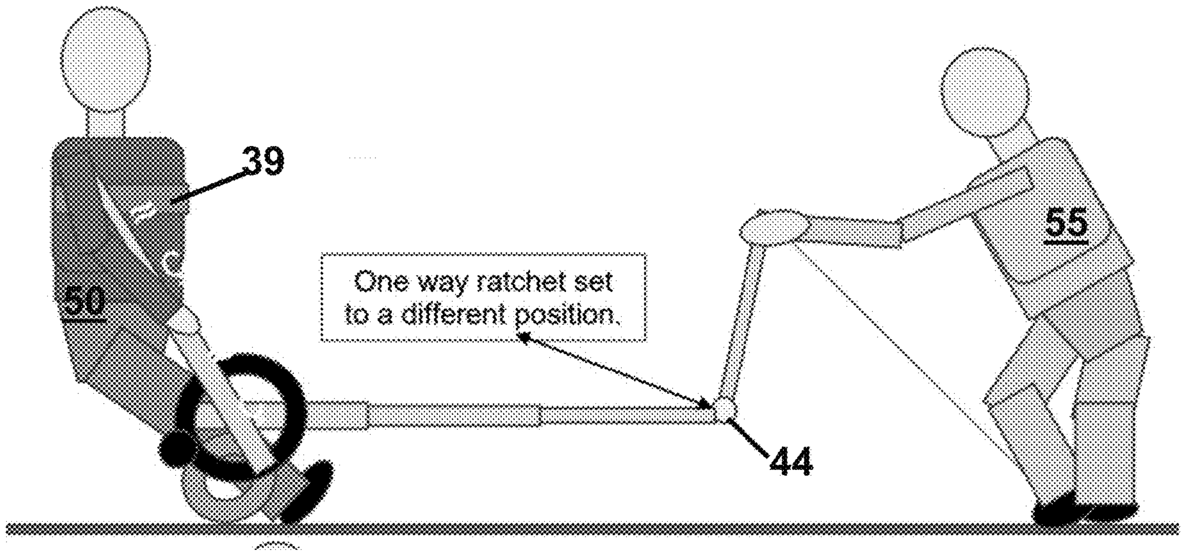
FIG. 4E shows a diagram of an operator 55 rolling a lifted patient 50 towards a chair.
Figure 4F:
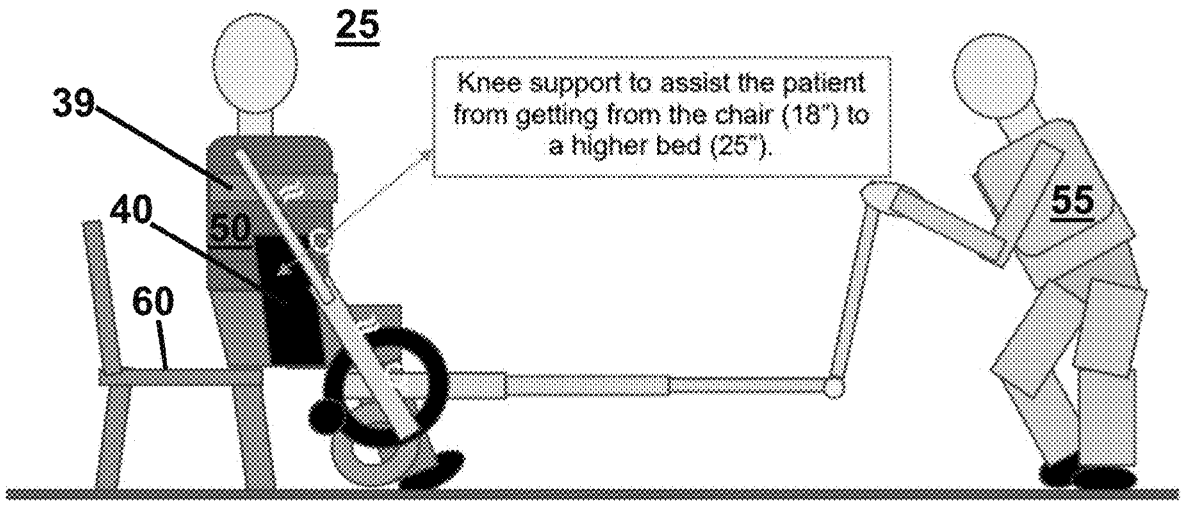
FIG. 4F shows a diagram of preparing to lift the patient 50 to a chair.
Figure 4G:
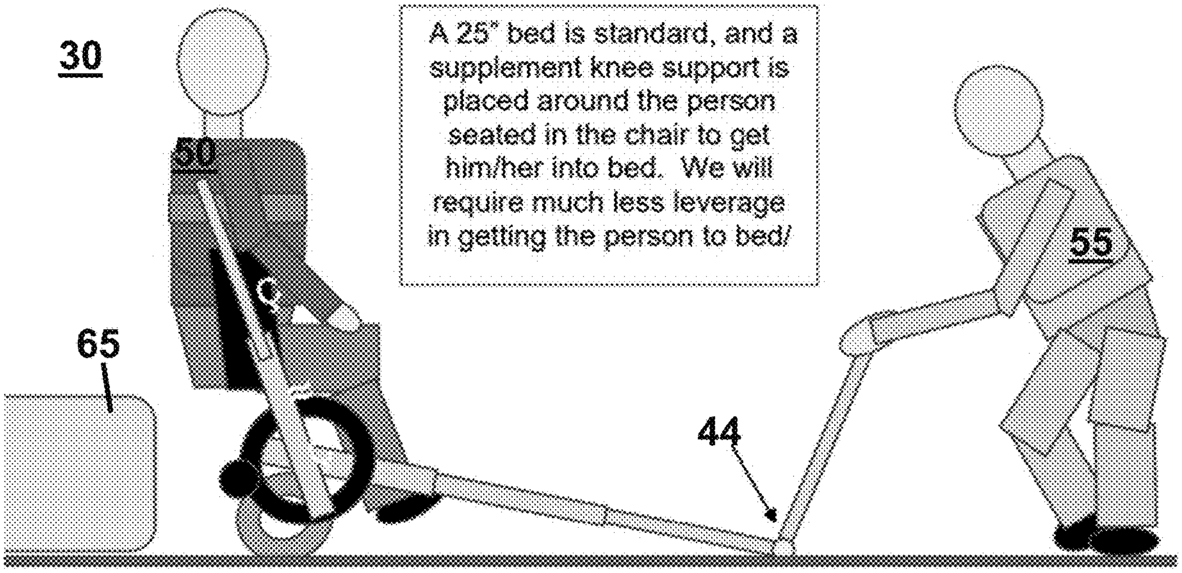
FIG. 4G shows a diagram of rolling a lifted patient to a bed.
Figure 4H:
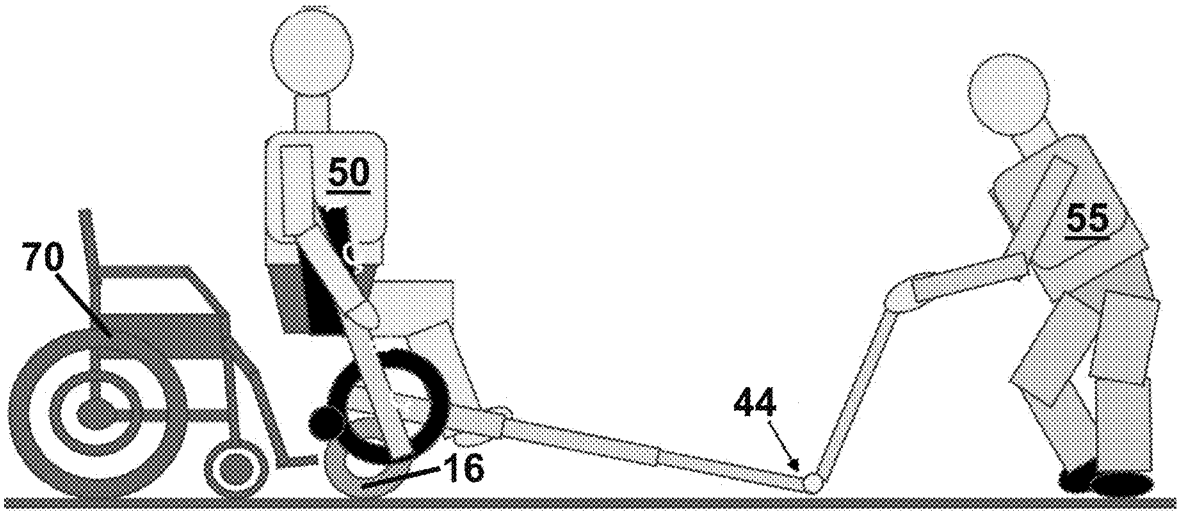
FIG. 4H shows a diagram of rolling a lifted patient to a wheelchair.
Figure 4I:
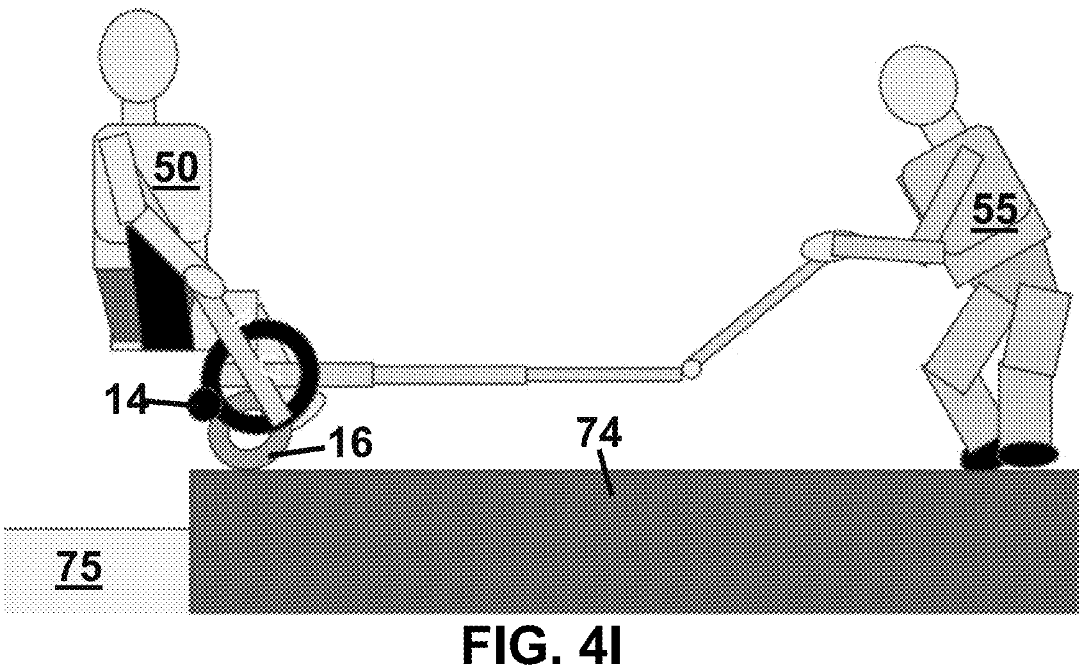
FIG. 4I shows a diagram of preparing to lower a patient into the water of a swimming pool 75.
Figure 4J:
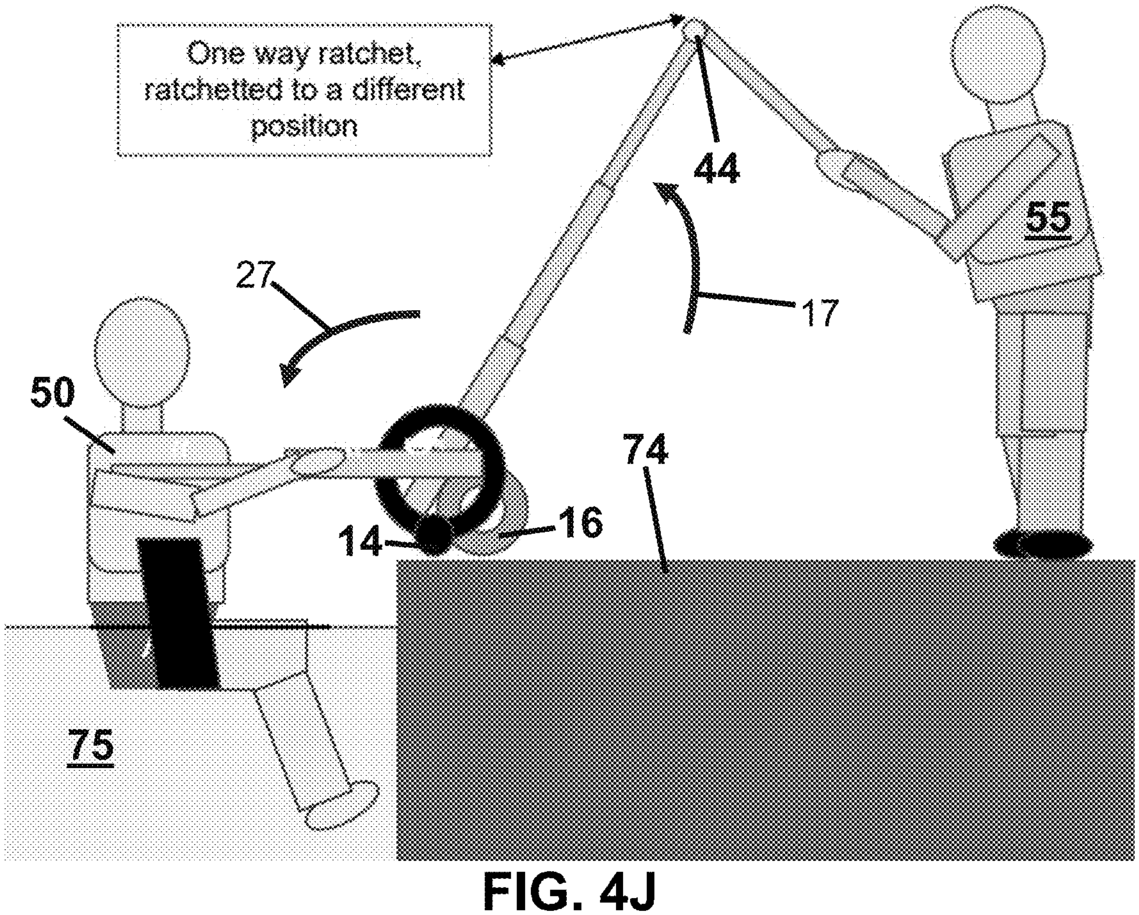
FIG. 4J shows a diagram of lowering a patient 50 into the water of a swimming pool 75.
Figure 4K:
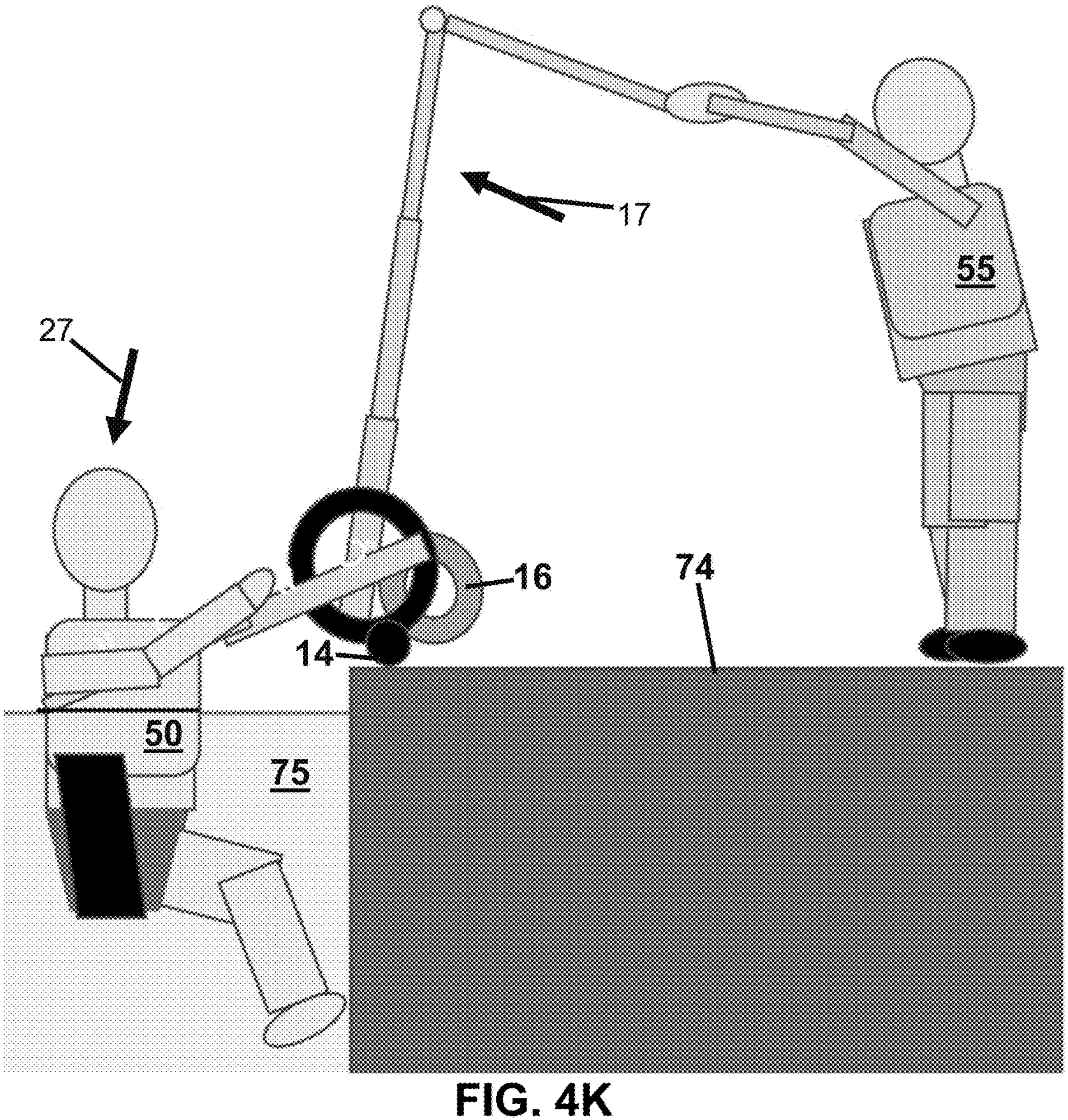
FIG. 4K shows a diagram of lowering a patient 50 deeper into the water of a swimming pool 75.

As shown in FIG. 4A a patient 50 is on the floor and needs help. At FIG. 4B, an operator 55 helps the patient 50 to a floor sitting position (FIG. 4B). In some examples, the operator might need to position a chair behind or nearby the patient. The various steps shown in the diagrams, for example, in FIG. 4C, FIG. 4D, FIG. 4E, FIG. 4F, and FIG. 4G were tried and practiced multiple times. FIG. 7 shows a flowchart for a method 700 for moving a fallen patient to a sitting position (e.g., sitting on a chair). At 705 is strapping the gait belt 39 around the chest or abdomen of the patient (e.g., FIG. 4C). At 710 is ensuring the patient holds on to a fulcrum crossbar and/or to load leverage arms (e.g., FIG. 5A or FIG. 6A). At 715 the operator uses leverage or effort leverage arms to lift the patient from floor (e.g., FIG. 5A). It is important to note that at 715 the operator can use the foot loop 24 to apply at least a portion of the operator's weight for the leverage. At 720 the operator rolls the patient to a chair (e.g., FIG. 5B). At 725 the operator lowers the patient onto the chair (e.g., FIG. 6A). At 730 the operator unstraps the gait belt from the patient and ensures patient is stabilized on chair. The flowchart shown in 700 does not show the optional steps of, for example, finding a chair and placing it nearby the patient before step 720.

FIG. 8 shows a flowchart for a method 800 for moving a patient from a sitting position to a bed position. It should be understood that a commode position can be about 28 inches (71.12 cm), and the method can work equally well for transport from bed to commode, from floor to commode, from commode to bed, or from chair to commode. For example, at FIG. 6B, the operator 55 is attaching the knee support 40 (or transfer sling 40) underneath the legs of the patient 50. The gait belt 39 is already secured around the chest of the patient. Thus, in FIG. 8, step 805 is fastening the gait belt around the chest or abdomen of the sitting patient. Step 810 is securing the knee support (or transfer sling 40) underneath the legs of the patient. At 815 the operator lifts the patient from the chair, for example, as shown in FIG. 6C. At 820 the operator has lifted the patient from the chair and now rolls the patient to a bed. At step 825 the operator lowers the patient down onto the bed. At step 830, the operator removes the knee support (or transfer sling 40) and gait belt and ensures the patient is stable on the bed. It is important to note that the flowchart shown in 800 does not include the optional steps. For example, 800 can include a visit to the bathroom wherein unfastening and re-fastening, lowering and raising can be done in a variety of step executions. The methods were tested on patients with different weights and with operators of different weights.

REFERENCES

[1]. (CDC) Centers for Disease Control and Prevention. Keep on Your Feet-Preventing Older Adult Falls. CDC. https://www.cdc.gov/injury/features/older-adult-falls/index-.html. Accessed Mar. 12, 2024.

[2]. Dykes P. C., et al. Cost of Inpatient Falls and Cost-Benefit Analysis of Implementation of an Evidence-Based Fall Prevention Program. *JAMA Health Forum.* 2023; 4 (1): e225125.

[3]. Prevention Centers for Disease Control and. Older Adult Falls Data. CDC. https://www.cdc.gov/falls/data/index-.html. Accessed Mar. 12, 2024.

[4]. IUPAC. International Union of Pure and Applied Chemistry GoldBook. https://goldbook.iupac.org/.

[5]. Merriam-Webster's Online Dictionary. https://www.merriam-webster.com/.

[6]. Porter R. S., & Kaplan, J. L. (Eds.). *The Merck manual of diagnosis and therapy* (19th ed.). Merck Sharp & Dohme Corp. 2011, (978-0-911910-19-3).

[7]. Robert S. Porter et al., (eds.). *The Encyclopedia of Molecular Cell Biology and Molecular Medicine*. Blackwell Science Ltd.; 1999-2012, (9783527600908).

[8]. Robert A. Meyers (ed.). *Molecular Biology and Biotechnology: A Comprehensive Desk Reference*. VCH Publishers, Inc.; 1995, (1-56081-569-8).

[9]. Luttmann Werner. Immunology. Elsevier; 2006,

[10]. Kenneth Murphy Allan Mowat, Casey Weaver (eds.). *Janeway's Immunobiology*. Taylor & Francis Limited; 2014, (9780815345305).

[11]. Krebs Jocelyn E., et al. *Lewin's genes XI.* 11th ed. Burlington, Mass.: Jones & Bartlett Learning; 2014, (1449659055).

[12]. Green Michael R. *Molecular cloning: a laboratory manual*/Michael R. Green, Joseph Sambrook. Cold Spring Harbor, N.Y: Cold Spring Harbor Laboratory Press; 2012, (1936113414).

[13]. Davis et al. *Basic Methods in Molecular Biology*. Elsevier Science Publishing, Inc.; 2012, (044460149X).

[14]. Jon Lorsch (ed.). *Laboratory Methods in Enzymology: DNA*. Elsevier; 2013, (0124199542).

[15]. Frederick M. Ausubel (ed.). *Current Protocols in Molecular Biology* (*CPMB*). John Wiley and Sons 2014, (9780471503385).

[16]. John E. Coligan (ed.). *Current Protocols in Protein Science* (*CPPS*). John Wiley and Sons, Inc.; 2005,

[17]. John E. Coligan ADA M Kruisbeek, David H Margulies, Ethan M Shevach, Warren Strobe, (eds.) *Current Protocols in Immunology* (*CPI*). John Wiley and Sons, Inc.; 2003, (9780471142737).

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The foregoing written specification is considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize or be able to ascertain using no more than routine experimentation, many equivalents to the specific embodiments described herein. Such equivalents are intended to be encompassed by the following exemplary claims.

I claim:

1. A patient lifting and transport device comprising:

a pair of wheel assemblies located at a fulcrum of a lever frame, each wheel assembly including a plurality of rolling elements at different effective radii relative to the fulcrum;

a pair of shorter load leverage arms extending from the fulcrum toward a patient-contact region; and a pair of longer effort leverage arms extending from the fulcrum opposite the patient-contact region and terminating in operator handles, wherein the lever frame is configured such that changing an elevation of the longer effort leverage arms shifts contact between the rolling elements so that a first rolling element supports the device during approach and a second rolling element supports the device during lifting and transport, the second rolling element having a greater effective radius than the first rolling element.

2. The device of claim 1, wherein the plurality of rolling elements comprises smaller rolling wheels and medium rolling wheels mounted on respective axles coaxial with the wheel assemblies.

3. The device of claim 1, wherein the operator handles are coupled to the longer effort leverage arms by hinges that provide a plurality of indexed angular positions.

4. The device of claim 1, further comprising at least one fulcrum crossbar extending between the wheel assemblies and providing a grasp region for a patient during lifting.

5. The device of claim 1, further comprising a flexible cable attached to a distal region of at least one longer effort leverage arm or to one operator handle, the cable terminating in a foot loop configured to receive an operator's foot to apply additional force.

6. The device of claim 1, wherein a mechanical advantage defined as an effective effort length divided by an effective load length is about 1.5.

7. The device of claim 1, wherein the shorter load leverage arms have a length in a range from about 60 cm to about 155 cm.

8. The device of claim 1, wherein the effective effort length measured to a distal end of an operator handle is in a range from about 120 cm to about 310 cm.

9. The device of claim 1, wherein the lever frame is a class 1 lever having a lever angle greater than 90 degrees at the fulcrum when the device is in a lifting orientation.

10. The device of claim 1, wherein the device is configured to roll on the first rolling element during approach under the patient and to roll on the second rolling element during transport after lifting.

11. The device of claim 1, wherein the wheel assemblies comprise bicycle-style wheels and the rolling elements are supported on parallel axles fixed relative to the wheel assemblies.

12. The device of claim 1, wherein at least one hinge associated with the operator handles includes a ratchet mechanism.

13. The device of claim 1, wherein at least one of the shorter load leverage arms includes attachment interfaces for straps to secure the patient to the device.

14. The device of claim 1, wherein the device comprises one or more of aluminum, magnesium, carbon fiber, rubber, or foam, and has a weight from about 9 kilograms to about 12 kilograms.

15. The device of claim 1, wherein the second rolling element is engaged when the longer effort leverage arms are pulled downward past a threshold angle, and the first rolling element is engaged when the longer effort leverage arms are raised above the threshold angle.

16. A method of lifting and transporting a patient using a lever-based device, comprising:

positioning the device under the patient while the device rolls on a first rolling element at a first effective radius relative to a fulcrum;

grasping operator handles coupled to longer effort leverage arms of the device;

applying a downward force to the longer effort leverage arms to pivot the device so that a second rolling element at a greater effective radius contacts a support surface;

elevating the patient with shorter load leverage arms as the device pivots onto the second rolling element; and transporting the patient while the device rolls on the second rolling element.

17. The method of claim 16, further comprising selecting an indexed position of a hinge that couples an operator handle to a longer effort leverage arm before applying the downward force.

18. The method of claim 16, further comprising placing a foot of the caregiver into a foot loop at an end of a cable attached to a distal region of the device and stepping downward to augment the downward force.

19. The method of claim 16, further comprising halting transport when the patient is aligned with a target surface height and reversing the pivot to lower the patient onto a chair, bed, commode, or wheelchair.

20. A kit comprising the device of claim 1 together with instructions that describe: rolling the device on the first rolling element to approach the patient, applying force to the longer effort leverage arms to pivot the device onto the second rolling element to lift the patient, and transporting the patient while the device rolls on the second rolling element.

* * * * *